United States Patent
Vrzic et al.

(10) Patent No.: US 10,750,410 B2
(45) Date of Patent: Aug. 18, 2020

(54) ULTRA RELIABLE LOW LATENCY CONNECTION SUPPORT IN RADIO ACCESS NETWORKS

(71) Applicants: Sophie Vrzic, Kanata (CA); Jaya Rao, Ottawa (CA)

(72) Inventors: Sophie Vrzic, Kanata (CA); Jaya Rao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/718,394

(22) Filed: Sep. 28, 2017

(65) Prior Publication Data

US 2018/0098250 A1    Apr. 5, 2018

Related U.S. Application Data

(60) Provisional application No. 62/402,710, filed on Sep. 30, 2016, provisional application No. 62/443,152, filed on Jan. 6, 2017, provisional application No. 62/469,708, filed on Mar. 10, 2017.

(51) Int. Cl.

| H04W 36/00 | (2009.01) |
|---|---|
| H04W 36/18 | (2009.01) |
| H04W 76/15 | (2018.01) |
| H04W 72/04 | (2009.01) |

(52) U.S. Cl.
CPC ....... H04W 36/0016 (2013.01); H04W 36/18 (2013.01); H04W 36/0069 (2018.08); H04W 72/0453 (2013.01); H04W 76/15 (2018.02)

(58) Field of Classification Search
CPC ............. H04W 36/0016; H04W 36/18; H04W 36/0069; H04W 76/15; H04W 72/0453
See application file for complete search history.

(56) References Cited

U.S. PATENT DOCUMENTS

| 2008/0080516 A1 | 4/2008 | Sammour et al. |
| 2009/0016301 A1 | 1/2009 | Sammour et al. |
| 2015/0326371 A1 | 11/2015 | Baek |
| 2015/0327094 A1 | 11/2015 | Lee et al. |
| 2015/0327130 A1 | 11/2015 | Park et al. |
| 2015/0351119 A1* | 12/2015 | Song ................. H04W 72/1268 370/329 |

(Continued)

FOREIGN PATENT DOCUMENTS

| CN | 105580419 A | 5/2016 |
| CN | 105659690 A | 6/2016 |

(Continued)

OTHER PUBLICATIONS

InterDigital Communications, Packet Duplication at PDCP, 3GPP TSG-RAN WG2 Meeting #97, Athens, Greece, Feb. 13th-17th, 2017, R2- 1701186. (Year: 2017).*

(Continued)

*Primary Examiner* — Shailendra Kumar

(57) ABSTRACT

Methods and systems in which a UE can establish and maintain a data connection to a plurality of Radio Access Nodes for the creation of redundant data links is disclosed. Methods of implementing packet duplication as well as methods of determining when to activate or deactivate packet duplication are also disclosed.

24 Claims, 14 Drawing Sheets

(56) References Cited

U.S. PATENT DOCUMENTS

| | | | |
|---|---|---|---|
| 2016/0057585 A1* | 2/2016 | Horn | H04W 80/02 |
| | | | 370/312 |
| 2016/0065700 A1* | 3/2016 | Yi | H04L 69/04 |
| | | | 370/328 |
| 2016/0242193 A1 | 8/2016 | Hong et al. | |
| 2016/0249259 A1* | 8/2016 | Park | H04W 36/00 |
| 2016/0255619 A1 | 9/2016 | Yi et al. | |
| 2016/0269982 A1* | 9/2016 | Larsson | H04L 5/0014 |
| 2016/0302075 A1* | 10/2016 | Dudda | H04W 12/10 |
| 2016/0302218 A1 | 10/2016 | Behravan | |
| 2017/0078975 A1 | 3/2017 | Takeda | |
| 2018/0098250 A1 | 4/2018 | Vrzic | |
| 2018/0279168 A1 | 9/2018 | Jheng | |
| 2018/0279169 A1 | 9/2018 | Wang | |
| 2018/0279262 A1 | 9/2018 | Babaei | |
| 2018/0288631 A1 | 10/2018 | Wei | |
| 2018/0309660 A1 | 10/2018 | Loehr | |
| 2018/0310202 A1 | 10/2018 | Lohr | |
| 2018/0317123 A1 | 11/2018 | Chen | |
| 2018/0324641 A1 | 11/2018 | Tsai | |
| 2018/0324642 A1 | 11/2018 | Yu | |
| 2018/0332501 A1 | 11/2018 | Tseng | |
| 2018/0368107 A1 | 12/2018 | Babaei | |
| 2018/0368132 A1 | 12/2018 | Babaei | |

FOREIGN PATENT DOCUMENTS

| | | |
|---|---|---|
| CN | 107979847 A | 5/2018 |
| CN | 108616909 A | 10/2018 |
| CN | 109151891 A | 1/2019 |
| EP | 3522667 A1 | 8/2019 |
| WO | 2015002458 A1 | 1/2015 |
| WO | 2015067823 A1 | 5/2015 |
| WO | 2016028563 A1 | 2/2016 |

OTHER PUBLICATIONS

International Search Report dated Jan. 2, 2018 for corresponding International Application No. PCT/CN2017/104549 filed Sep. 29, 2017.

CATT: "Generic U-plane Stack for NR",3GPP DRAFT; R2-164801, Aug. 21, 2016,total 10 pages. XP051126510.

Ericsson: "L2 transport of SRBs and relation to RLF handling", 3GPP DRAFT; R2-134221, Nov. 13, 2013, total 5 pages. XP050736968.

Intel Corporation: Challenges of RRC Diversity, 3GPP Draft; R2-132821, Aug. 10, 2013,total 2 pages. XP050718543.

R2-1701186 InterDigital Communications,"Packet Duplication at PDCP",3GPP TSG-RAN WG2 Meeting #97,Athens, Greece, Feb. 13th-17th, 2017.

R2-1701986 Samsung,"Considerations on Packet Duplication for URLLC",3GPP TSG-RAN WG2 Meeting #97,Athens, Greece, Feb. 13th-17th, 2017.

Samsung, On the RRC diversity in small cell enhancements [online], 3GPP TSG-RAN WG2 # 84 3GPP TSG-RAN WG2#84 R2-134010, Nov. 15, 2013,total 4 pages.

Ericsson, St-Ericsson, Enhancing mobility robustness and offloading potential with RRC diversity [online], 3GPP TSG-RAN WG2 # 81bis R2-131211, Apr. 19, 2013,total 8 pages.

* cited by examiner

ULTRA RELIABLE LOW LATENCY CONNECTION SUPPORT IN RADIO ACCESS NETWORKS

CROSS-REFERENCE TO RELATED APPLICATIONS

This application claims the benefit of priority to U.S. Provisional Patent Applications U.S. Patent Application Ser. No. 62/402,710 entitled "Ultra Reliable Low Latency Connection Support in Radio Access Networks" filed Sep. 30, 2016, and U.S. Patent Application Ser. No. 62/443,152 entitled "Ultra Reliable Low Latency Connection Support in Radio Access Networks" filed Jan. 6, 2017, and U.S. Patent Application Ser. No. 62/469,708 entitled "Ultra Reliable Low Latency Connection Support in Radio Access Networks" filed Mar. 10, 2017 the contents of which are hereby incorporated by reference in their entirety.

TECHNICAL FIELD

This present invention relates to ultra-reliable and low latency connections in Radio Access Networks.

BACKGROUND

In a mobile communications network, a User Equipment (UE) connects to the network via the radio access network, and more specifically through a radio access link to a Radio Access Node, such as a NodeB, an evolved Node B (eNodeB) or other equivalent node including a gNodeB. Transmissions between the UE and a node in the network typically involve at least a wireless channel between a radio access node and the UE. Typically there are further wired connections between the radio access node and other nodes in the radio access network or a core network. Mobile networks have historically been designed to support the mobility of a UE (although mobility is not required in a UE). To maintain the connection between the UE and the network as the UE moves, handover procedures have been developed to allow a UE's session to be preserved as the radio access link moves between one access node and another. This process is known as a handover.

In developing handover procedures, the disruption of a connection with a UE as the UE is handed over from one eNodeB to another is expected. This has an impact on the reliability of a connection. A human operator using the mobile network for a voice call may not notice the disruption, but a data session for critical tasks may not be as forgiving.

The reliability of a connection is defined as a specified probability of successful transmission in a given time frame. For Ultra-Reliable Low Latency Connections (URLLC), a common reliability requirement is $1 \times 10^{-5}$. This means that 99.999% of packets transmitted must be correctly received within the latency requirement. The latency requirement can vary based on the needs of the service. It has been noted that there are now use cases in which LTE based networks cannot provide connections that guarantee the latency required by real-time applications. In order to ensure reliability of the radio access channel, existing network designs, including the Long Term Evolution (LTE) standards promulgated by the Third Generation Partnership Project (3GPP), make use of error correcting mechanisms such as a Hybrid Automatic Repeat reQuest (HARQ). While HARQ and other similar mechanisms can provide a certain degree of reliability, the reliability may come at the cost of an increased latency. If the latency requirement is 1 ms or less, then HARQ and Automatic Repeat reQuest (ARQ) may not be suitable, as they can increase the latency of the transmission.

In order to provide both reliable and low latency connectivity, other techniques are required especially in mobility scenarios. In scenarios of high mobility or in ultradense deployments, the number of handovers that a UE may be subject to may further adversely impact the ability to meet the reliability and latency requirements.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

According to one aspect, there is a method of performing packet duplication (PD) at a transmitter, comprising activating the PD at a Packet Data Convergence Protocol (PDCP) layer of the transmitter; and duplicating a PDCP PDU at the PDCP layer, wherein the duplicate PDCP PDUs are transmitted to two RLC entities.

According to one example, the activation of PD is applied in a dual-connectivity (DC)/multi-connectivity (MC) architecture or a carrier aggregation (CA) architecture. According to another, derivative example, the duplicate PDCP PDUs are assigned to different carriers. According to a $3^{rd}$ example, derivative of the previous, a PD function at the PDCP layer is responsible for the duplicating. According to a $4^{th}$, derivative on all previous, example the method further comprises deactivating the PD at the PDCP layer. According to a $5^{th}$, derivative on all previous, example MAC control elements (MAC CEs) are conveyed between the transmitter and a receiver to trigger an activation or a deactivation of the PD. According to a 6th example, derivative on all previous, RRC signalling is received for configuring the PD. According to a $7^{th}$ example, derivative on all previous, RRC signalling is received for activating or deactivating the PD.

According to another aspect there is a processing system for performing packet duplication (PD), comprising: a first unit, configured to activate the PD at a Packet Data Convergence Protocol (PDCP) layer of the processing system; and a second unit, configured to duplicate a PDCP PDU at the PDCP layer, wherein the duplicate PDCP PDUs are transmitted to two RLC entities.

According to one example the activation of PD is applied in a dual-connectivity (DC)/multi-connectivity (MC) architecture or a (CA) architecture. According to a derivative example the duplicate PDCP PDUs are assigned to different carriers. According to a further example derivative on those previous a second unit is a PD function at the PDCP layer responsible for the duplicating. A last example, derivative on the previous, includes a third unit, configured to deactivate the PD at the PDCP layer.

According to a third aspect there is a device, comprising: the processing system according to any derivation of the previous aspect, and a fourth unit, configured to convey MAC control elements (MAC CEs) to trigger an activation or a deactivation of the PD.

According to one example, the fourth unit is further configured to receive RRC signalling for configuring the PD. According to another example the fourth unit is further configured to receive RRC signalling for activating or deactivating the PD.

The foregoing and other objects, features, aspects and advantages of the present invention will become more apparent from the following detailed description, taken in conjunction with the accompanying drawings which description is by way of example only.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In discussing the provision of a URLLC level of service, it should be understood that a number of different networking levels need to be considered. Network layer details, as well as service layer details need to be considered, as does the management of session connectivity. Although some of the details in each of these parts of an overall solution overlap, an attempt will be made to deal with the details of one level at a time. As a result, figures may be introduced and discussed, and then discussed again as they pertain to a differ layer in the solution.

As noted above, the manner in which handover is achieved in an LTE networking environment can result in delayed delivery (or dropped packets) during a handover procedure. A UE is connected to a single eNodeB at a time. Leading up to the handover process, the UE is transmitting data to a single eNodeB, and the network is transmitting data to that same source eNodeB. However, as the UE connects to the target eNodeB, data that was sent to the source eNodeB before the handover and which had not been delivered, is not immediately present at the target eNodeB for delivery. This, as noted above, is not likely to be apparent to a human operator either on a voice call, or even watching a video stream that has been buffered locally. However, real time processes, including real time video sessions and certain control processes are not likely to be as forgiving.

In order to reduce the probability of Radio Link Failure (RLF) during mobility, enhancements to the handover procedure can be provided. One way to achieve seamless handover is to ensure that there is at least one Radio Access Network (RAN) node connected to the UE at all times. Downlink (DL) data can be made available to the target RAN node before a handover of the radio link. For Uplink (UL) communication, the target RAN node should have the path to the core network setup before a handover of the radio link. This allows for both UL and DL communications to be supported during a handover of the source RAN node to the target RAN node, which reduces the probability of RLF.

If the UE is at the edge of the service area of a source RAN node, initiating a handover to the target node too early may result in a RLF of the target node. Similarly, if a handover is initiated too late then a RLF may occur at the source node. In order to reduce the likelihood of packet loss or delay associated with the handover procedure and to reduce the probability of RLF, simultaneous communication with both the source and target RAN nodes can be provided for UEs near the edge.

Figure 1:
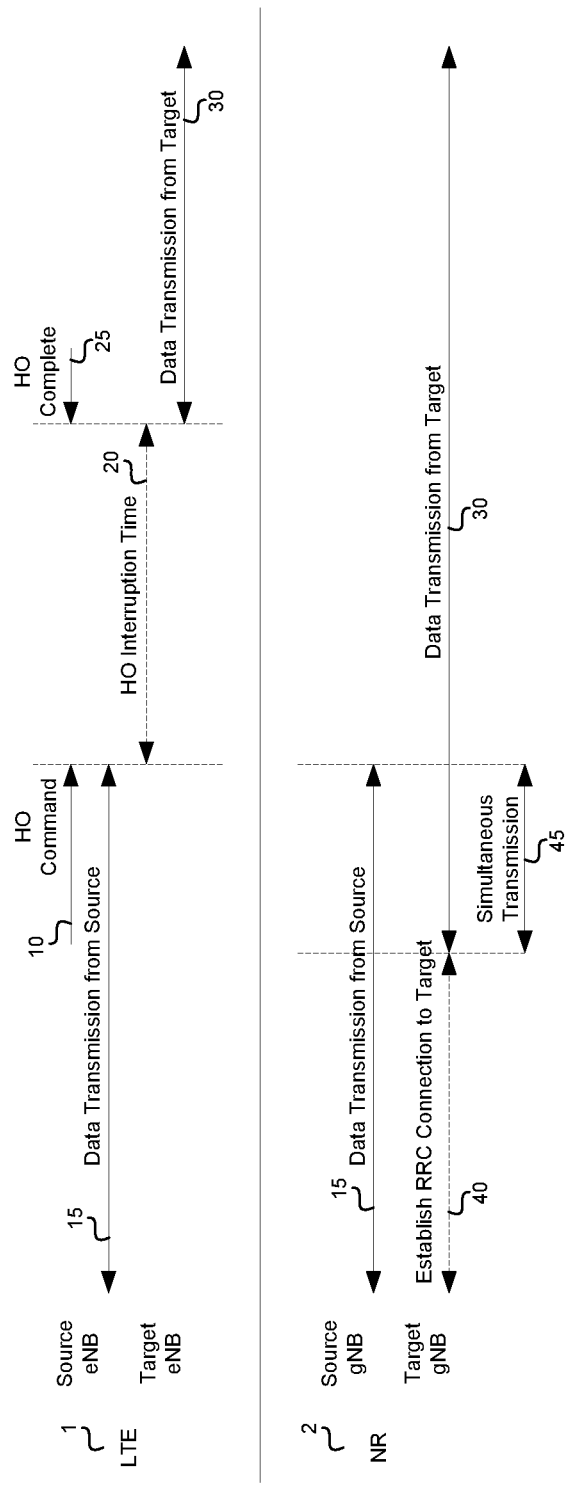
FIG. 1 is an illustration of the timing issues resulting in the Handover interruption time of LTE networks according to an embodiment.

The timing diagram of FIG. 1 showing the difference in the handover procedure between LTE and a proposed new radio (NR) technology. In conventional techniques, as shown by the LTE 1 process, after the handover (HO) command 10 is issued, there is a handover interruption time. In this window, transmissions with the UE are interrupted, By allowing the UE to connect to a plurality of different access nodes, as illustrated in the NR 2 process, there is a period of time 45 in which the UE is connected to more than one access node. This ensures that there is no interruption time (and effectively replaces the interruption time with a period in which simultaneous transmission 45 can be provided.)

This redundant transmission provides resilience to the possibility of link failure. It can also reduce any delays that would have been attributable to buffering by either end of the connection until the end of the handover interruption.

In the handover scenario where duplicate packets from the UE are received at both the source and target nodes, the duplicates can be removed either i) at the PDCP function of the target MgNB or ii) at the upper layers. That is, packets arriving within a latency bound from the source MgNB to the target MgNB via Xn can be detected and removed by the PDCP function at the target MgNB. Packets that may potentially exceed the latency bound over the Xn are forwarded directly by both the source and target MgNB nodes to be detected and removed at the upper layers. It should be understood that MgNB refers to a master gNB.

In order to ensure seamless handover of the MgNB, a make-before-break handover procedure may be used. For URLLC use cases, the UE may establish connectivity to the target MgNB before releasing the RRC connection to the source MgNB to allow for packet duplication via both MgNBs during a mobility event.

During a normal handover of UE connectivity from the source MgNB to a target MgNB, the UE may have only one link available for communication (data and RRC signaling), since the UE is required to release the RRC connection of the source MgNB before it establishes a new RRC connection to the target MgNB. In this case, the target reliability cannot be satisfied with a single link. Hence, simultaneous transmission of data and RRC signaling with links towards both the source and target MgNB throughout the handover will ensure higher reliability.

According to an example, during the Simultaneous Transmission period 45 the UE is connected to more than one access node (e.g., Source gNB and the Target gNB). During the Simultaneous Transmission period 45, the Data Transmissions from Target 31 includes duplicate packets to those carried during the Simultaneous Transmission period 45 by the Data Transmission from the Source 15. In other words, during Simultaneous Transmission period 45, the Data Transmissions from Target 31 is a redundant transmission to that of the Data Transmissions from Target 31. To avoid interference the Data Transmissions from Target 31 utilizes a different channel (or equivalently a different carrier) than the Data Transmission from the Source 15.

Again, according to an example, the handover interruption time can be a window 20, and may persist until handover is complete 25. The interruption window 20 may separate the Data Transmission from the Source signal 15 and the Data Transmissions from Target signal 30. The UE may Establish RRC Connection to Target 40 during the Data Transmission from the Source signal 15. The Data Transmissions from Target 31 may commence prior to the end of the Data Transmission from the Source 15.

It should be appreciated that the examples have been discussed with reference to MgNB nodes, other suitably equipped network access nodes can also be used including a base station (for example a NodeB, an evolved Node B (eNodeB, or eNB), a next generation NodeB (sometimes referred to as a gNodeB or gNB), or a Base Band Unit (BBU) associated with one or more remote radio heads.

Figure 8:
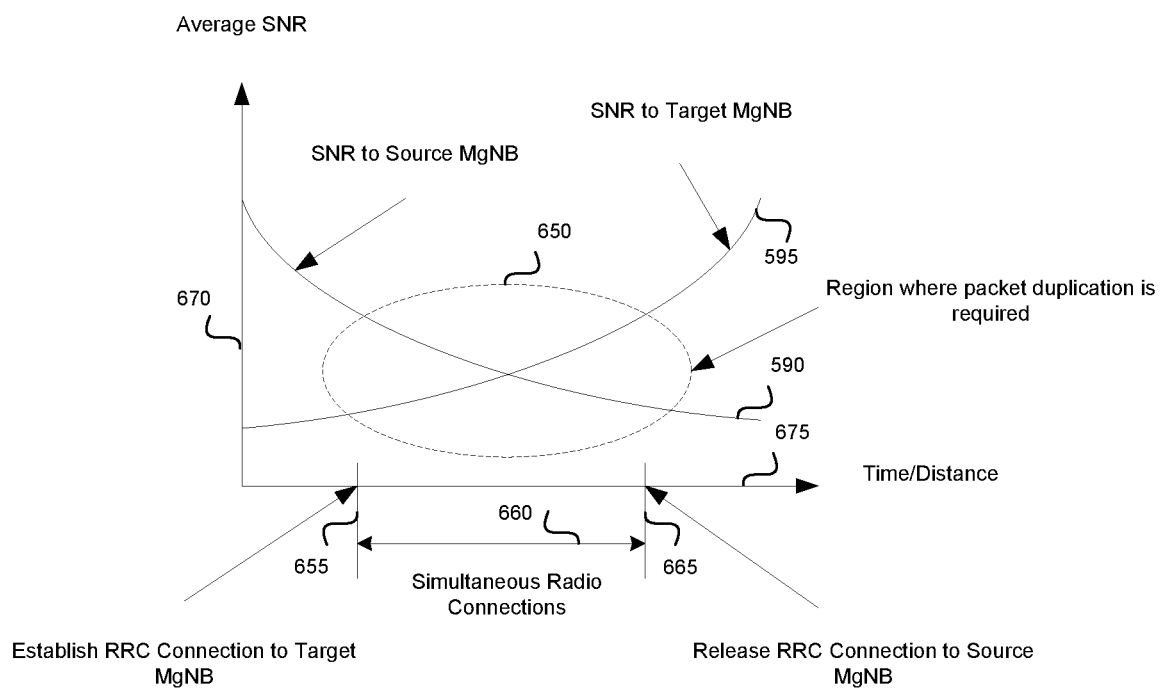
FIG. 8 illustrates the average Signal to Noise Ratio (SNR) from source Master gNB (MgNB) and target MgNB during handover, according to an embodiment.

The benefits of using packet duplication also reveal benefits of using simultaneous radio connections during a handover. FIG. 8 illustrates the average SNR 670 from the source MgNB and the target MgNB during a handover.

The dependant variable axis of the graph illustrated by FIG. 8 is SNR and the independent variable axis of this graph is Time/Distance 675. FIG. 8 plots the "SNR to Source MgNB" 590 and "SNR to Target MgNB" 595 curves as well as the "Region where packet duplication is required" 650. The Time/Distance to "Establish RRC Connection to Target MgNB" 655, "Release RRC Connection to Source MgNB" 665, and the Time/Distance when there should be "Simultaneous Radio Connections" 660 between the UE and a plurality of ANs is also illustrated in FIG. 8.

The conditions during handover are similar to the channel conditions for the scenarios that show a large gain for using packet duplication. During a handover of the source MgNB, the average delta SNR between the source MgNB and the target MgNB is small and the average SNR for the best link is typically low. It can be concluded that packet duplication can be used during handover using simultaneous radio connections with the source and target nodes. With packet duplication, the target reliability can be achieved with lower overall resource usage.

Multi-connectivity (MC), the ability of the network to support a plurality of different connection paths, can aid in satisfying the reliability requirement. By ensuring that a UE always has at least two paths to the CN, such as during a handover, there is a reduced probability that the UE connection will be dropped or interrupted. In the multi-connectivity scenario, the UE can be connected to multiple access nodes on the same carrier or on different carriers.

LTE provides rudimentary dual-connectivity (DC) functionality. To provide multi-connectivity, the network elements can be designed to extend this DC concept in LTE. The 3C architecture option defined by the 3GPP can be used, where there is one common PDCP entity.

In a MC scenario (which may include a DC scenario) a radio access node is designated as a primary radio access node. Data packets can be sent to a secondary RAN node (by the primary radio access node) over an Xn interface. Uplink packets may be received by any of the RAN nodes to which the UE is connected. Each of the secondary RAN nodes then sends the received packets to the primary RAN node over the Xn Interface.

Figure 2:
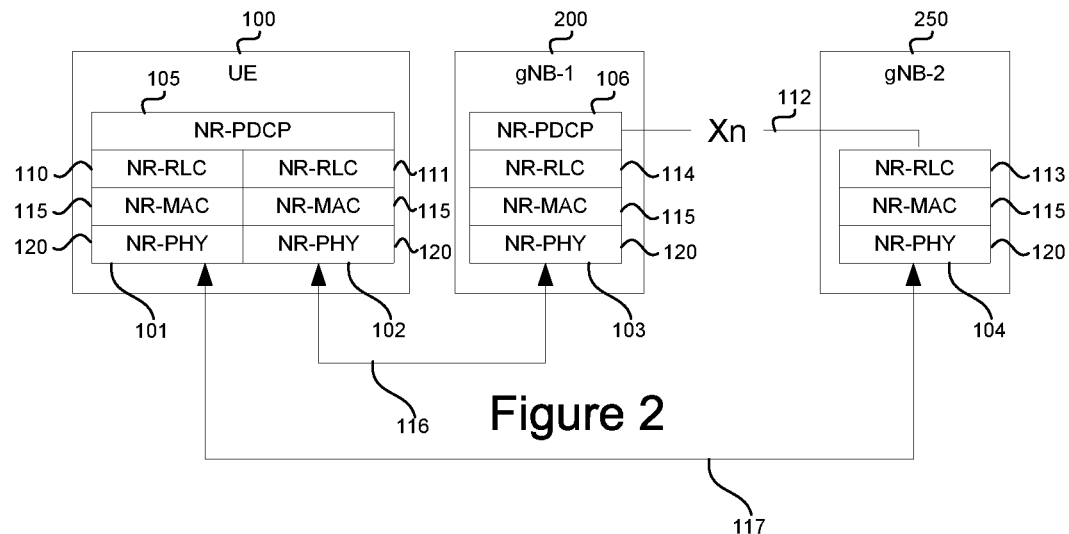
FIG. 2 illustrates a logical view of the connection between a UE and a plurality of radio access nodes, according to an embodiment.

FIG. 2 illustrates a protocol stack of the NR, where gNB refers to an access node.

The primary gNB (gNB-1 200) acts as an anchor or MgNB for this connection. If a new gNB (gNB-2 250) is to be added, the primary gNB will create a new Xn link 112 to the additional gNB. The PDCP layer 106 in the Anchor node can be used to remove the duplicate packets that are received from the multiple RAN nodes communicating with the UE 100. The UE can be permitted to move across multiple distributed RAN nodes connected to the same Anchor node without needing to re-establish the security association with the PDCP layer 106. When the UE 100 moves out of a coverage area associated with the anchor RAN node, the UE can establish the security association with the PDCP function in the target RAN node. Alternatively, the core network can initiate the key exchange during the mobility event.

Figure 11:
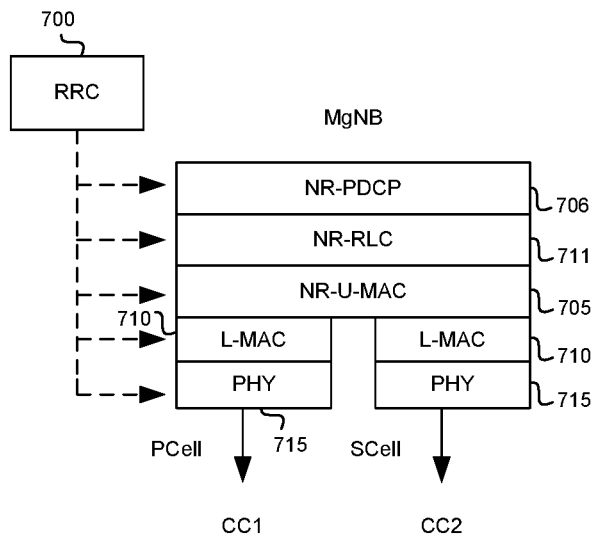
FIG. 11 illustrates NR CA Architecture for supporting PD, according to an embodiment.

In order to ensure seamless handover of the Anchor node function from a first gNB to a second gNB, a make-before-break handover procedure can be used. The UE 100 can establish a radio connection with the target Anchor node before releasing the RRC connection of the source Anchor node. Therefore, the UE 100 will have two simultaneous radio connections during a mobility event with only one RRC connection to the source RAN node. An exemplary procedure using simultaneous radio connections is illustrated in FIG. 11. It should be understood that SgNB refers to a Secondary gNB.

In the handover procedure, when the condition for handover is satisfied, the source MgNB sends an RRC connection reconfiguration for establishing a radio bearer to the target MgNB. In this case, the UE maintains a radio connection and RRC connection with the source MgNB. After the RB to the target node is established, packet duplication can be used for both data and RRC signaling.

According to an example embodiment of the handover procedure of FIG. 2, the UE 100 is configured with two protocol stack entities 101, 102 so that UE 100 can simultaneously communicate with two access points (e.g, gNB's 200, 250). UE protocol stack entity 101 includes NR-RLC entity 110, NR-MAC entity 115, and NR-PHY entity 120. UE protocol stack entity 102 includes a NR-RLC entity 111, NR-MAC entity 141, and NR-PHY entity 142 Both UE protocol stacks 101,102 share a common NR-PDCP entity 105. The primary gNB's (gNB-1 200) protocol stack entity 103 includes a NR-PDCP 106, NR-RLC entity 114, NR-MAC entity 115, and NR-PHY 120 entity. The second gNB's (gNB-2 250) protocol stack entity 104 includes NR-RLC 113, NR-MAC entity 115, and NR-PHY entity 120, but does not require its own PDCP entity. The gNB-2 250 protocol stack entity 104 communicates with gNB-1 200's NR-PDCP 105 via the Xn 112 interface. UE protocol stack entity 102 including NR-RLC entity 111, NR-MAC entity 141 and NR-PHY entity 142 communicates with the primary gNB's (gNB-1 200) protocol stack entity 103 using a first radio channel 116. UE protocol stack entity 101 including NR-RLC entity 110, NR MAC entity 115 and NR-PHY entity 120 communicates with the secondary gNB's (gNB-2 250) protocol stack entity 104 using a second radio channel 117.

It should be appreciated that, as an example, the second gNB's (gNB-2 250) protocol stack entity 104 can include a PDCP entity, but such a PDCP entity is disabled or not used in this example when another RAN node is acting as a master or anchor node. Accordingly, when the UE moves out of range from its anchor gNB (e.g., gNB-1 200), another gNB (e.g., gNB-2 250) is configured as the new anchor RAN node, activating its PDCP entity. It should also be appreciated that while only 1 secondary RAN node is illustrated in FIG. 2, there can be additional secondary access nodes.

Figure 3:
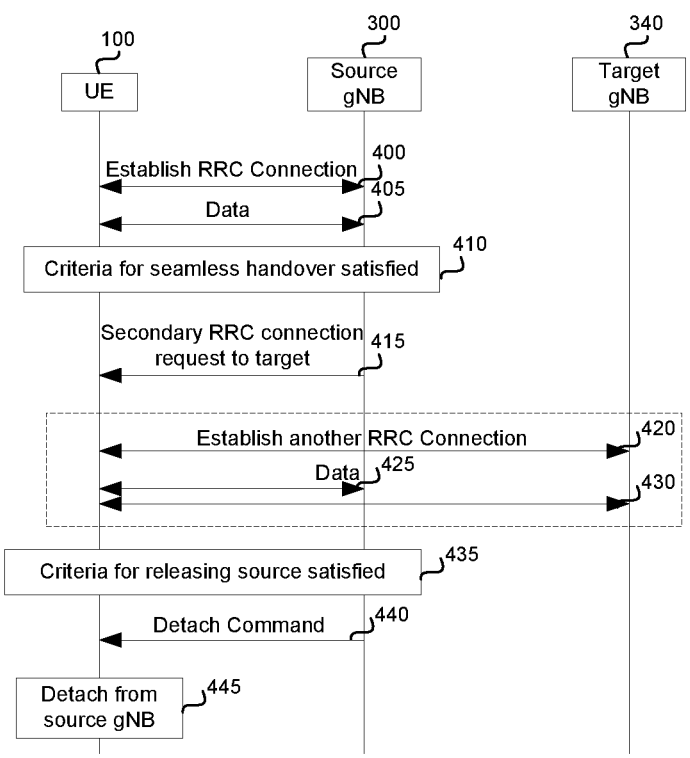
FIG. 3 illustrates a method of handover, according to an embodiment.

Another example procedure is illustrated in FIG. 3, using simultaneous radio connections, according to an embodiment.

FIG. 3 illustrates the handover procedure after the RRC connection and a path to transfer data between the UE 100 and the Source gNB 300 have been established (via the Establish RRC Connection 400 and the Data 405 signals). When the condition for handover is satisfied (via "Criteria for seamless handover satisfied" procedure 410), the source gNB 300 sends an RRC connection reconfiguration for establishing a radio bearer (RB) to the target gNB (as illustrated by the "Secondary RRC connection request to target" 415 signal) to UE 100. In some embodiments this activates packet duplication (PD) to ensure PDUs are not lost during handover. In this case, the UE 100 maintains a radio connection and RRC connection with the source gNB 300. After the RB to the target node is established, as illustrated by the "Establish another RRC connection" signal 420 passed between the UE 100 and target gNB 340, packet duplication can be used for both data and RRC signaling. In this embodiment, packet duplication includes transmitting duplicated packets between UE 100 and Source gNB 300 via "Data" signal 425 and between UE 100 and the Target gNB 340 via "Data" signal 430.

When the condition for releasing the RRC connection with the source node is satisfied, the source node (and optionally the target node) sends an RRC connection reconfiguration command to complete the RRC connection to the target node. The radio link with the source node is maintained. Once the RRC connection is established to the target node the UE may detach the radio connection from the source node.

This is illustrated by the "Criteria for releasing source satisfied" process 435. The "Detach Command" 440 sent from the Source gNB 300 to UE 100 causes UE 100 to execute the "Detach from source gNB" process 445. In some embodiments this can trigger PD deactivation if PD is not required all the time for the session.

In some embodiments, the UE sends duplicate packets to a plurality of access nodes. Each of the access nodes send the received packets to the PDCP function of the primary access node (which may involve transmission over an Xn interface, or other such interface). In the DL direction, the PDCP function in the primary node generates duplicate packets and forwards the packets to the secondary node/nodes over an Xn interface. The UE removes any duplicate packets received.

The redundant transmission afforded by the redundant connection can further reduce the delay by eliminating the re-ordering delay in the RLC and PDCP layers. In embodiments of the URLLC in which ARQ and HARQ are not used, re-ordering at the RLC and PDCP layers may not be necessary. Similarly, the RLC re-ordering may not be necessary. Although one RLC entity may have missing PDUs, in a MC architecture, there is an increased likelihood that a PDU that would otherwise be missing will be received by at least one of the radio nodes. This results in a reduced probability of each RLC missing the same PDU. As noted, embodiments of the proposed invention may afford for the elimination, or reduction in the amount, of reordering necessary if ARQ and HARQ are not employed in the presence of multiple redundant packets.

Figure 4:
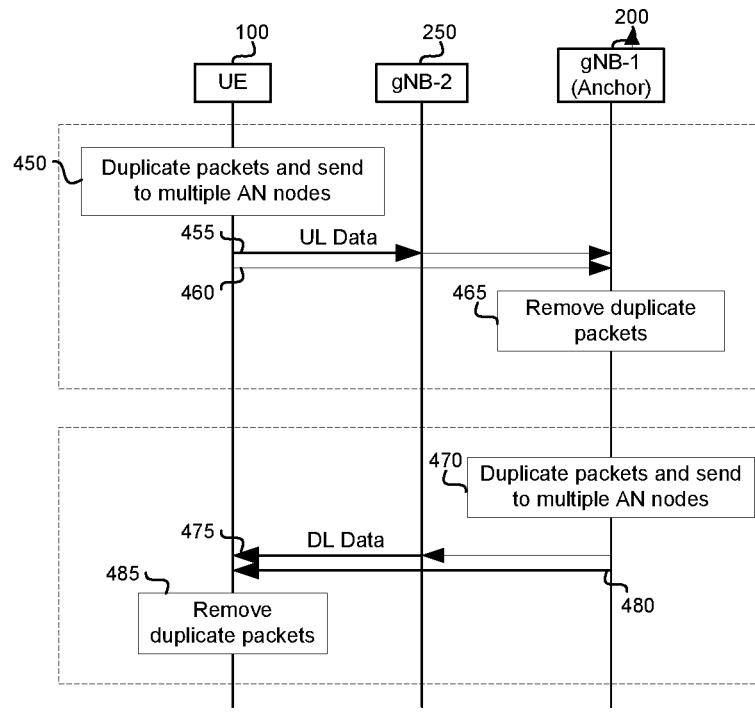
FIG. 4 illustrates a method of transmitting data over redundant links, according to an embodiment.

FIG. 4 illustrates an exemplary embodiment of a URLLC transmission. Duplicate UL packets in this embodiment are removed by the anchor RAN node, while the UE 100 removes duplicate DL packets. For UL transmission, the UE 100 transmits packets to each of a plurality of access. As a result, a single packet may be received by more than one access node. All received packets are forwarded by the plurality of received AN nodes to a single RAN node (the anchor RAN node gNB-1 200), typically over the Xn 112 interface as noted earlier. Only the anchor RAN node gNB-1 200 needs to implement a PDCP function for this connection. The packets received by the anchor node (both over the air interface and over the Xn interface 112) are forwarded to the PDCP function 106. The PDCP function 106 of the Anchor node removes the duplicate packets resulting from the redundant connection. In DL transmissions, the PDCP function 105 in the UE 101 can be used to account for duplicate packets received as a result of the redundant transmissions from the plurality of access nodes. Each of the secondary access nodes receives packets for redundant transmission over the Xn interface 112 from the primary access node.

Accordingly PDCP included in gNB-1 200 can duplicate packets and pass them to both gNB-2 250 and UE 100 (illustrated by the "Duplicate packets and send to multiple AN nodes" process 470 and DL Data signals 475 and 480). UE 100 also includes a PDCP 105 that executes the "Remove duplicate packets" process 485 to remove duplicated packets received from both gNB-1 200 and gNB-2 250. Once again, in some embodiments, it does not matter whether it is the original PDU or the duplicate PDCP PDU which is removed (e.g., deleted).

According to one example of the embodiment of FIG. 4, the anchor RAN node is gNB-2 250). In an example of the same embodiment the UE 100 transmits packets to each of a plurality of access nodes as illustrated by the "Duplicate packets and send the multiple AN nodes" process 450 and UL Data signals 455 and 460. Process 450's packet duplication includes producing a duplicated PDU (referred to as a duplicate PDCP PDU) is performed by FIG. 2's NR-PDCP 105. The duplicated packets from NR-PDCP 105 are transmitted simultaneously to gNB-1 200 and gNB-2 250 via the UE's two NR protocol stack entities 101, 102 and more specifically the NR RLC 110, 111, NR MAC 115, 141 and NR PHY 120, 142 entities. Accordingly the PDCP layer 105 duplicates packets, and delivers an original PDCP PDU via a first RLC entity 110, first MAC entity 115 and first PHY entity 120 and delivers a duplicate PDCP PDU via a second RLC entity 111, second MAC entity 141 and second PHY entity 142. For example, UE protocol stack entity 101 (includes NR-RLC entity 110, NR MAC entity 115 and NR PHY entity 120) transmits an original PDCP PDU via communication channel 117 to the gNB-2 250. Similarly, UE protocol stack entity 102 (includes a NR-RLC entity 111, NR MAC entity 141 and NR PHY entity 142) transmits a duplicate PDCP PDU to the gNB-1 200 via communication channel 116.

According to another example of the embodiment of FIG. 4 the PDCP function 106 of the Anchor node removes the duplicate packets resulting from the redundant connection as illustrated by the "Remove duplicate packets" process 465. In some embodiments, it does not matter whether it is the original PDU or the duplicate PDCP PDU which is removed (e.g., deleted).

Removing duplicate packets is illustrated by the "Remove duplicate packets" in example process 465. In some embodiments, it does not matter whether it is the original PDU or the duplicate PDCP PDU which is removed (e.g., deleted).

It will be appreciated that the above proposed method and system can make use of simultaneous transmissions over a plurality of redundant links. This can be used to reduce the likelihood of RLF and increase the reliability of the connection. These redundant links can be created through a multi-connection architecture, of which a dual connection architecture can be understood as a special case. The PDCP function can be centered in the primary RAN node and the UE. Secondary RAN nodes can receive downlink packets from the primary RAN node over the Xn interface, and can provide received uplink packets to the primary RAN node over the Xn interface without applying PDCP functions. The PDCP functions can be used to detect and address duplicate packets Issues related to provision of redundant connectivity as discussed above, from the perspective of the network layer, will now be discussed.

In a system that allows MC/DC, a UE will connect to a RAN node, for service. As the UE moves, it may connect to a second RAN node. The first RAN node will be considered the source RAN node. As the UE approaches a second RAN node (referred to as a target RAN node), it can connect to the target RAN node, while still communicating with the current serving (source) RAN node. To reduce the delay associated with handover at least one of the following requirements should be addressed:

- The target RAN node may be provided context information about the UE (and its connections) before the UE establishes a connection to the target RAN node. This allows for a reduction in the handover delay that would otherwise be caused by the UE needing to establish context information with the target RAN node;
- Connections to the core network (CN) for both UL and DL traffic may be established by the target RAN in advance of (or no later than the time of) establishing the connection with the UE;
- Downlink traffic destined for the UE, may be made available to both the current serving RAN node and the target RAN node.

While the above factors can reduce the likelihood of packet delay or connection loss with the UE, it should also be understood that other factors can contribute to the reliability required for a URLLC connection. Such factors can include a requirement for redundant links, both radio links and links in the network infrastructure. Such redundant links may be provided using different RAN nodes, some of which may employ a different Radio Access Technology (RAT). In cases, the redundant connection can make use of the above described DC/MC architecture. This can allow for UL and DL transmissions using a plurality of different transmit/receive points. Another factor can include support for a seamless handover. Seamless handover support in the network can help to ensure that the UE has access to a connection to the network with limited or no interruption of service during a transition from one radio link to another. Seamless handovers can also aid in ensuring that packets are neither lost nor delayed when switching from one radio access link to another.

Multi-connectivity can be used to help in satisfying reliability requirements by ensuring that a UE always has at least two paths to the CN. In the multi-connectivity scenario, the UE can be connected to multiple access nodes on the same carrier or on different carriers. In some cases, different access nodes can be using different RATs (e.g. LTE and NR). Dual connectivity can make use of different generations of radio access links (e.g. an LTE or HSPA) connection along with a next generation radio access technology (e.g. 5G RAT) which may make use of different frequency connections (e.g. sub 6 GHz or millimeter wave connections). For example, different frequency connections may be used to support Multi-RAT.

Multi-connectivity can be enabled through an extension of the existing DC concept in LTE. The 3C architecture option can be used, where there is one common PDCP entity, for example the gNB-1 200 as illustrated in FIG. 2. Because initial deployments of a next generation (such as a so-called 5G network) may not have uniform coverage, connectivity through multiple RATs (e.g. NR and LTE) allows for early support of a URLLC service without needing to wait for a deployment that covers a full geographic area. The transmission of data across multiple RATs should take into account the different interworking deployment options. For example, a next generation radio technology (NR) may operate in standalone mode or it may be supported by an LTE node. A node from either generation can be used as the anchor node. In the multi-RAT case, the serving RAN nodes can contain transmission and reception points (TRPs) from both RATs.

Figure 5:
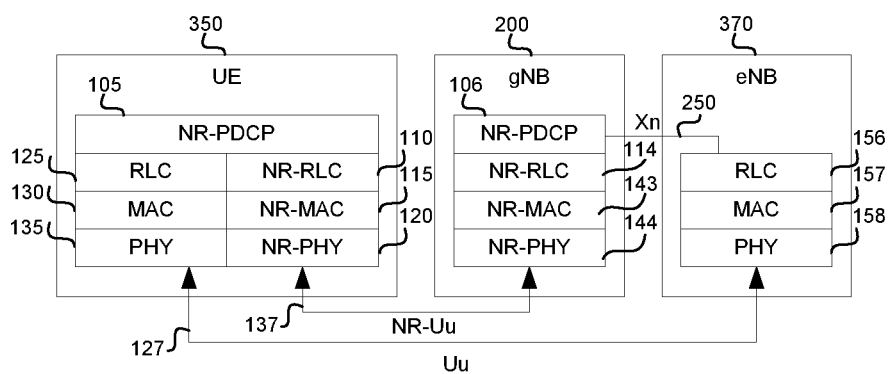
FIG. 5 illustrates a method of transmitting data over redundant links, according to an embodiment.

As shown in FIG. 5, a UE 350 can communicate with a next generation Node B (gNodeB, or gNB), over an interface indicated as NR-Uu 137, which is an analog to the Uu 127 interface to an LTE eNB. An Xn interface 112 is used to connect the primary RAN node (gNB 200) to a secondary RAN node (eNB 370). Similar to the discussion above with respect to FIG. 2, the Xn interface allows for downlink traffic to be pushed to the target RAN node, and for UL traffic received by the target RAN node to be pushed to the primary RAN node. PDCP functions can be implemented at the UE and the primary RAN node (here illustrated as the gNB 200). Those skilled in the art will appreciate that further secondary nodes can be connected, each having an Xn interface to the primary RAN node.

The PDCP layer 105 in the primary/anchor RAN node can be relied upon to remove duplicate UL packets received from the UE 350 over the plurality of radio links. The UE 350 can move through the combined service areas of the plurality of target RAN nodes each connected to the same Anchor node. In some embodiments, the connection can be shifted between the connected RAN nodes without needing to re-establish the security association with the PDCP layer. When the UE moves out of coverage of the anchor RAN node the UE can establish the security association with the PDCP function in the target RAN node. Alternatively, the core network can initiate the key exchange during the mobility event.

UE 350 uses two layer stacks when connected simultaneously to both NR RANs and LTE RANs. The layer stack used by UE 350 to connect with the LTE RAN eNB 370 includes a RLC 125, MAC 130, and PHY 135 layers. This ability to simultaneous connect to two different Radio Access Technologies (RATs) enables support for multiple Radio Access Technologies (multi-RAT). The layer stack used by UE 350 to connect with NR RAN gNB 200 includes NR-RLC 110, NR-MAC 115, and NR-PHY 120 layers. Both of these layer stacks in this embodiment share a NR-PDCP 105 layer. gNB 200 in this embodiment's layer stack includes NR-PDCP 106, NR-RLC 114, NR-MAC 143, and NR-PHY 144 layers. eNB 270 in this embodiment's layer stack includes RLC 156, MAC 157, and PHY 158 layers.

Figure 6:
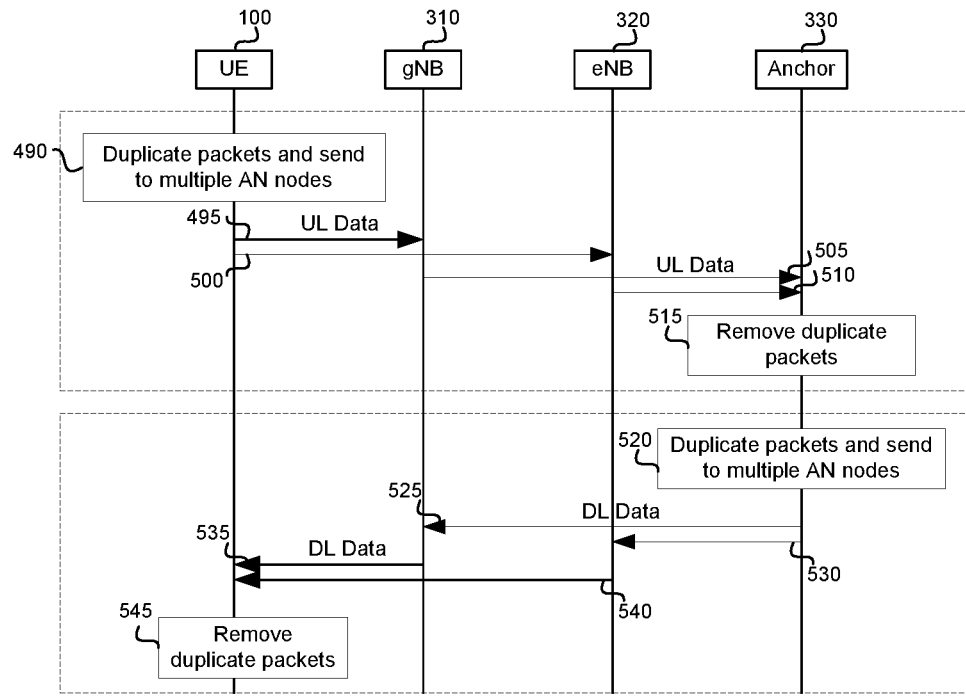
FIG. 6 illustrates a logical view of the connection between a UE and a plurality of radio access nodes, according to an embodiment.

UL and DL transmissions in a URLLC scenario are illustrated in FIG. 6. As can be seen, the UE sends duplicate packets to a plurality of access nodes. Each of the access nodes send the received packets to the PDCP function of the primary access node (which may involve transmission over an Xn interface, or other such interface). In the DL direction, the PDCP function in the primary node generates intentional duplicate packets by forwarding packets to the secondary node/nodes over an Xn interface. The UE removes any duplicate packets received.

FIG. 6 illustrates an embodiment where the UE 100 connects to an LTE eNB 320 as well as gNB 310 and Anchor node 330 to illustrate the UE's ability to be connected simultaneously to both NR RANs and LTE RANs. Thus FIG. 6 illustrates an embodiment that allows simultaneous connection to two different Radio Access Technologies (RATs), although it should be appreciated that this is an example of multiple Radio Access Technologies (multi-RAT). UE 100 duplicates packets and sends them to both the gNB 310 and eNB 320 via the "Duplicate packets and send to multiple AN nodes" process 490 and "UL Data" signals 495 and 500. Each of the access nodes send the received packets to the PDCP function of the Anchor node 330 (which may involve transmission over an Xn interface, or other such interface). Accordingly, gNB 310 then passes this data to Anchor 330 via the "UL Data" 505 signal, which can be via an Xn interface It should be appreciated that in some embodiments, gNB 310 can act as the anchor node, in which case signal 505 represents internal signalling between entities. eNB 320 also passes the same data to Anchor 330 via the "UL Data" 510 signal (which can be an Xn Interface). Anchor 330 includes a PDCP function configured to remove duplicate UL packets it receives by executing the "Remove duplicate packets" 515 process. Anchor 330 also duplicates DL packets and sends them to both the eNB 320 and gNB 310 via the "Duplicate packets and send to multiple AN nodes" 520 process and "DL Data" 525 and 530 signals, which can be via an Xn interface) eNB 320 sends DL data it receives from Anchor 330 to UE 100 via "DL Data" 540 signal. gNB 310 also sends DL data it receives from Anchor 330 to UE 100 via "DL Data" 535. UE 100 removes duplicate DL data it receives from eNB 320 and gNB 310 by executing the "Remove duplicate packets" process 545.

Figure 9:
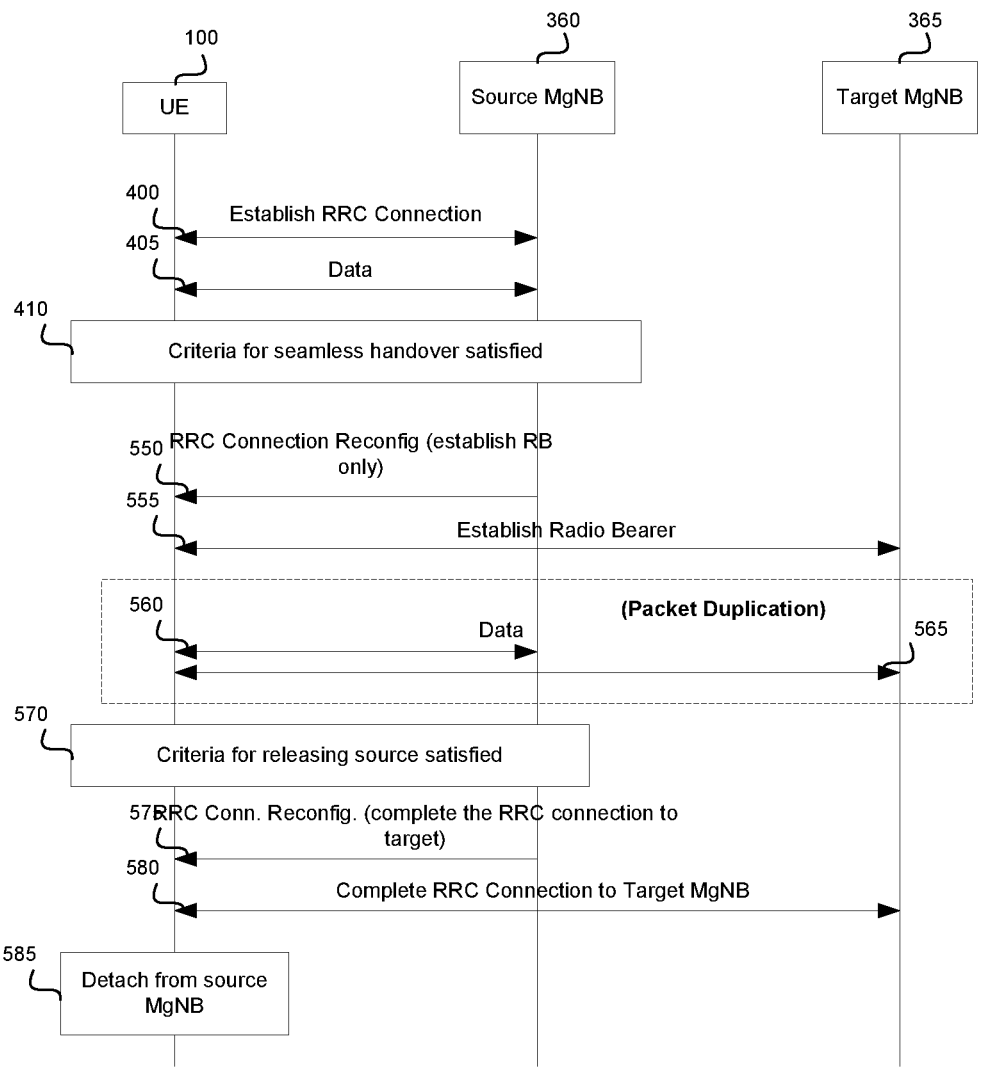
FIG. 9 illustrates a method of seamless handover procedure with RRC transmission diversity and data duplication towards the source and target nodes, according to an embodiment.

In order to ensure seamless handover of the Anchor node responsibilities, a make-before-break handover procedure can be used. The UE can establish a radio connection with the target Anchor node before releasing the RRC connection of the source Anchor node. Therefore, the UE will have two simultaneous radio connections during a mobility event, but there is one RRC connection with the source node. The handover procedure using simultaneous radio connections is illustrated in FIG. 9.

In the handover procedure, when the condition for handover is satisfied, the source MgNB 360 sends an RRC connection reconfiguration for establishing a radio bearer to the target MgNB. In this case, the UE 100 maintains a radio connection and RRC connection with the source MgNB 360. After the RB to the target node 365 is established, packet duplication can be used for both data and RRC signaling.

When the condition for releasing the RRC connection with the source node is satisfied, the source node (and optionally the target node) sends an RRC connection reconfiguration command to complete the RRC connection to the target node. The radio link with the source node is maintained. Once the RRC connection is established to the target node the UE may detach the radio connection from the source node.

The redundant links, used in the above described method and system, can be achieved through the use of MC (of which DC can be viewed as a special case). In such a configuration, the RAN nodes can be configured to use a common PDCP entity. The PDCP function for the transmitting RAN nodes can support packet duplication for a multi-connectivity architecture. The PDCP functions at the primary RAN node and at the UE can be assigned responsibility for handling packet duplication. During mobility, the UE can be provided with a plurality of simultaneous radio connections to both source and target RAN nodes to allow for reduction in the likelihood of service interruption in handovers. In this case, the UE maintains a single RRC connection.

According to an example, the procedure may begin after the RCC connection has been established ("Establish RRC Connection" 400 and "Data" 405 signals) between UE 100 and Source MgNB 360. It should be appreciated that the procedure for handover, packet duplication, and releasing the source, according to the embodiment illustrated in FIG. 9, is an alternative to the embodiment illustrated in FIG. 3.

According to further example, there is a "Criteria for seamless handover satisfied" process 410 optionally provided for satisfaction of the handover condition. The destination of the RRC connection reconfiguration for establishing a radio bearer may be the UE 100 via the "RRC Connection Reconfig. (establish RB only) signal 550. The target node 365 may be established via the "Establish Radio Bearer" 555 signal. For packet duplication, data may be transmitted between UE 100 and Source MgNB 360 via "Data" 560 signal and between UE 100 and Target MgNB 365 via "Data" 565 signal.

Again, by example, the condition for releasing the RRC connection with the source node may be satisfied via the "Criteria for releasing source satisfied" procedure 570). The source node may signal this via the "RRC Conn. Reconfig. (complete the RRC connection to target)" signal 575 and target node via the "Complete RRC Connection to Target MgNB" 580 signal. The UE may detach the radio connection from the source node via the "Detach from source MgNB" process.

Figure 7:
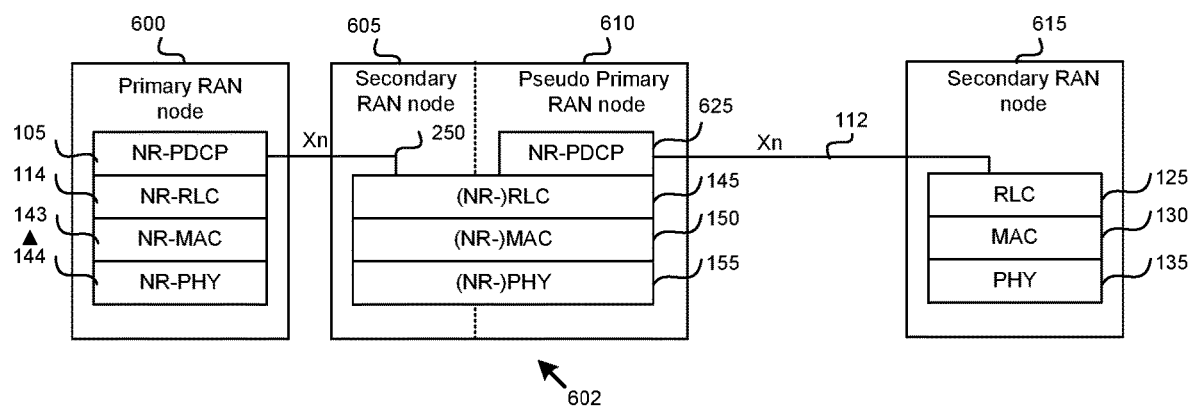
FIG. 7 illustrates a logical view of the connection between a UE and a plurality of radio access nodes, according to an embodiment.

FIG. 7 illustrates an embodiment in which a Radio Access Node 602 is shown operating as a secondary node 605 to a primary node 600, and also operating as a primary node 610. to another secondary node 615 As will be understood, each primary node can have a plurality of secondary nodes, and such a structure as illustrated in FIG. 7 allows for a tree-like structure in modeling the relationship between nodes.

In order to achieve better resource utilization and improve spectral efficiency when supporting packet duplication (PD), the various diversity techniques supported in LTE and 5G (new radio (NR)) architectures can be exploited and enhanced. These architectural techniques include:

Multi-connectivity/Dual-connectivity (MC/DC): Mode of operation where the UE is able to access radio resources provided by at least two different network access nodes (e.g. Master and Secondary gNBs) which are connected via a non-ideal backhaul (i.e. Xn interface). In an example, the network access nodes can be Master and Secondary gNBs of the same or different Radio Access Technologies (RATs).

Carrier Aggregation (CA): Mode of operation where multiple component carriers (CCs) can be used together in both frequency division duplex (FDD) and time division duplex (TDD) transmission modes to achieve high data rates. In this architecture, multiple small cells can be configured with different carriers. The small cells are connected to the macro cell with ideal backhaul.

Enhancements that can be made to the MC/DC and CA architectures to support PD techniques will be discussed below.

First, enhancements that can be made to the MC/DC architectures to support PD techniques will be discussed, according to various embodiments. The MC/DC architecture includes the master and secondary gNBs (MgNB 600, 610 and SgNB 605, 615) connected via the Xn interfaces 250, 112. While the MgNB 600 hosts the full RAN protocol stack (composed of the PDCP 105, RLC 114, MAC 143 and PHY 144 layers), the SgNB 615 hosts only the lower layers (i.e. RLC 125, MAC 130 and PHY 135). Also each MgNB can support multiple links/cells, consisting of a Primary Cell (PCell) and a number of Secondary Cells (SCells). Collectively, the cells/links controlled by the MgNB form the Macro Cell Group (MCG). The SgNB, in turn, supports and controls the Secondary Cell Group (SCG) including a Primary-Small Cell (PSCell) and a number of SCells.

It should be appreciated that Primary RAN node 600 supports an Xn interface 250 to communicate with Secondary RAN node 605. The Secondary RAN node 605 hosts the lower layers which include NR-RLC 145, NR-MAC 150 and NR PHY 155. Pseudo Primary RAN node 610 hosts the full RAN protocol stack including NR-PDCP 625 along with the lower layers which include NR-RLC 145, NR-MAC 150 and NR PHY 155. It is noted that in the embodiment illustrated the lower layers which include NR-RLC 145, NR-MAC 150 and NR PHY 155 are shared between Pseudo Primary RAN node 610 and the Secondary RAN node 605, but it should be appreciated that separate RLC, MAC and PHY entities could be used.

Figure 10:
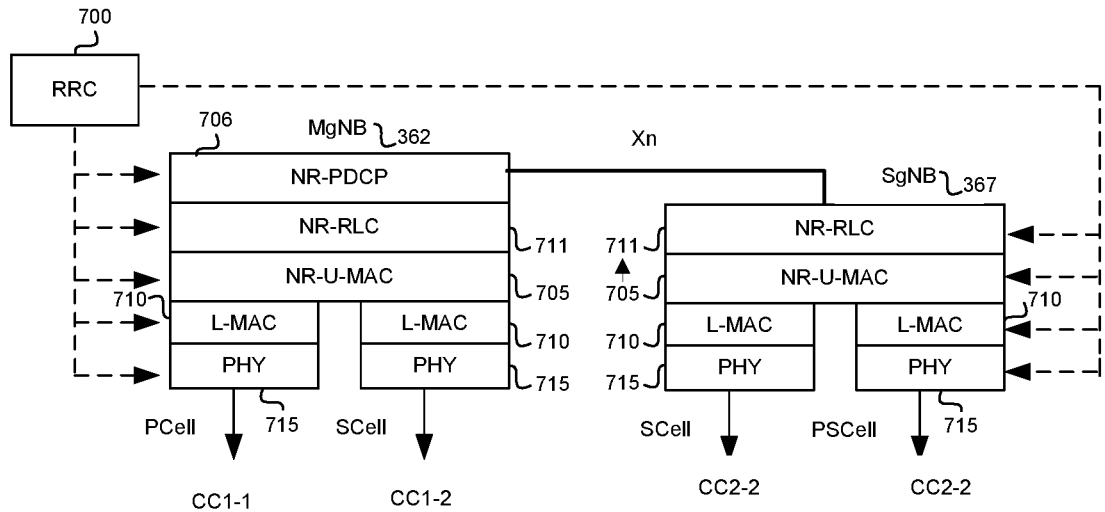
FIG. 10 illustrates an NR MC/DC Architecture for supporting PD, according to an embodiment.

The RRC entity 700 hosted at the MgNB 362, will be responsible for configuring all the protocol layers of both the MgNB 362 and SgNB 367 as shown in FIG. 10. FIG. 10 illustrates an example NR MC/DC Architecture for supporting PD, according to an embodiment. For supporting PD, a goal is to configure and assign each duplicate protocol data unit (PDU) to a different set of links/cells in the MgNB 362 and SgNBs 367 to realize maximum diversity. In another embodiment, the MC/DC Architecture can include other RATs. For example, it may include NR in combination with LTE or eLTE.

In such an MC/DC architecture, the PDCP 706 entity at the transmitter hosts a new Packet Duplication (PD) function which duplicates the PDCP PDUs. Each instance of the duplicate PDUs may carry the same PDCP sequence number (SN). At the receiver, the PDCP entity hosts a PD removal function which may perform combining of the received PDCP PDUs (e.g. using a bit level soft combining technique).

The radio bearer to logical channel mapping between PDCP and RLC can be configured to be one-to-one such that further duplication is not necessary at the RLC 711 layer. The RLC may be configured (by RRC 700) to operate in either the unacknowledged mode (UM) or the transparent mode (TM) mode when PD at PDCP is activated.

In each access node (i.e. MgNB 362 and SgNB 367) in MC/DC, the logical channels at the MAC 705 layer may be mapped to a transport channel associated with a different link/cell/carrier. In this case, the mapping between each logical channel to transport channel is also configured to one-to-one. There can be a common scheduler/multiplexer at the upper MAC (U-MAC 705) layer that can perform cross-carrier scheduling of the MAC PDUs or transport blocks (TBs) across different link/cell/carrier. In the lower MAC (L-MAC 710) layer, each link can in turn be handled by its own HARQ process that can be configured to support a certain maximum number of re-transmissions (e.g. 1 re-transmission per HARQ process). This allows the HARQ processes (for each link) to operate independently of each other.

At the PHY 715 layer, each transport channel can be handled by its own PHY 715 entity, enabling different number of physical resource blocks (PRBs) and modulation and coding schemes (MCS) to be configurable in both downlink (DL) and Uplink (UL) transmissions.

Enhancements that can be made to the CA architecture to support PD techniques will be discussed, according to various embodiments. FIG. 11 illustrates an example NR CA Architecture for supporting PD, according to an embodiment. The CA architecture includes a standalone access node which can include a full RAN protocol stack with the capability to support transmissions over multiple CCs. The CCs, in turn, can include a Primary Cell (PCell) and a number of Secondary Cells (SCells). For supporting PD, each duplicate packet can be assigned to a different CC. Also in CA, the duplication function can be hosted either at the PDCP entity or the MAC entity.

In the case when PD is performed at PDCP 706, a similar operation can be implemented as described above with respect to the MC/DC architecture. In some embodiments, if PD is performed at the MAC 705 layer each received MAC service data unit (SDU) (from the RLC 711) can be duplicated into multiple MAC PDUs (i.e. multiple transport blocks (TBs) of the same size). Here, in contrast to the case of duplicating at the PDCP, the mapping between each logical channel to transport channel is 1-to-many. Accordingly the RRC 700 can configure the MAC layer to ensure that each transport channel is mapped to a different CC.

At the U-MAC 705, there can be a common scheduler/multiplexer which can perform cross-carrier scheduling of the MAC PDUs between different CCs. There can also be a common HARQ entity that can function across different CCs while supporting a common HARQ buffer. At the L-MAC 710, each CC can be associated with its own HARQ process, which may be configured to handle a certain maximum number of re-transmissions. The received data in each HARQ process can be stored in the common buffer managed by the common HARQ entity. The HARQ ACK/NACK feedback in each HARQ process can be controlled from the common HARQ entity. At the receiver, soft combining technique can be used to perform combining of the received packets across different HARQ processes at the common HARQ entity. Additionally, soft combining at the receiver removes the duplicates and the resulting PDU is forwarded to the upper layers (i.e. RLC 711 and PDCP 706).

The following table is a Summary of Architectural Impacts for supporting PD, according to embodiments.

|  | Impacts in CA to support PD | Impacts in MC/DC to support PD |
| --- | --- | --- |
| RRC | RRC may configure the CCs for packet duplication. The SCells are added/removed based on (UL control information (UCI). | RRC may configure MgNB and SgNBs for PD. The SgNBs are added/removed based on UCI and/or neighbour cell measurements. |
| PDCP | No impact unless packet duplication is performed at PDCP. If PD is performed at PDCP then a new PD function is required. | Consists of new PD function which is responsible for duplicating PDCP PDUs at Tx and removing received duplicate PDUs (via a combining technique) at Rx |
| RLC | No impact. ARQ is configured in UM or TM mode by default at both MgNB and SgNB | No impact. ARQ is configured in UM or TM mode by default at both MgNB and SgNB |
| MAC | Consist of common U-MAC (scheduler, HARQ entity) and multiple L-MAC (for each CC). In DL, common scheduler performs duplication of the MAC SDUs received from upper layers. Each duplicated PDU is assigned to different CCs. In the receiver, the PDUs from different CCs are soft combined. Each CC may allow re-transmission for HARQ. A common HARQ entity may manage all CC-HARQ processes. For UL Tx, the UE is assigned multiple UL grants on different CCs for PD. The receiver in the gNB may perform soft combining across CCs. | In DL, a common scheduler/multiplexer may perform cross-carrier scheduling of the MAC SDUs received from upper layers. Each MAC PDUs are assigned to different CCs (PDSCH). In the receiver, the PDU from different CCs (PUSCH) need not be combined. HARQ process in each CC may support retransmissions but cross CC-HARQ management of HARQ is not required. |
| PHY | No impact | No impact |

Triggering techniques to support Packet Duplication will now be discussed according to various embodiments.

In the initial access procedure (i.e. RRC Connection Establishment procedure) the UE is able to provide its capability information to the PCell (i.e. MgNB) indicating the number of CCs and Tx/Rx chains (for accessing SgNBs) it can support. The UE may specifically indicate its preference for Inter-band CA configuration and the reliability requirement to support URLLC.

Based on specified capability, the RRC entity configures the PCell and a number of SCells in the MCG for supporting URLLC transmissions. Optionally, the RRC may also configure a set of SCGs, consisting of PSCell and SCells in the SgNBs, as part of the RRC Connection Reconfiguration procedure. In the case when the PSCell in the SgNB is configured, the configuration parameters are transmitted from the MgNB via RRC containers (as part of SgNB Addition/Change request procedure) over the Xn interface.

New SgNBs can be added to the existing SCG set and existing SgNBs can be either updated or released via the RRC Connection Reconfiguration procedure in the case when the UE is mobile. After the initial access procedure, the following options can be applied as a triggering mechanism to activate/deactivate the PD mode.

Triggering for packet duplication and link selection will now be discussed according to various embodiments.

As an alternative to PD, Link Selection (LS) techniques according to embodiments can achieve reliability by selecting and provisioning the best available transmission link based on fast channel measurements. This is based on the assumption that there exists a coverage region in the network with highly favorable channel conditions (e.g. High SNR with line of sight (LOS), low load) where transmitting over a single best link is sufficient to satisfy the URLLC requirements. Outside of this region PD approaches as discussed herein are used to satisfy URLLC requirements.

In this regard, a triggering mechanism can be applied to toggle between LS and PD modes based on a selection criterion which can be implemented either at the network or UE as described below.

Figure 12:
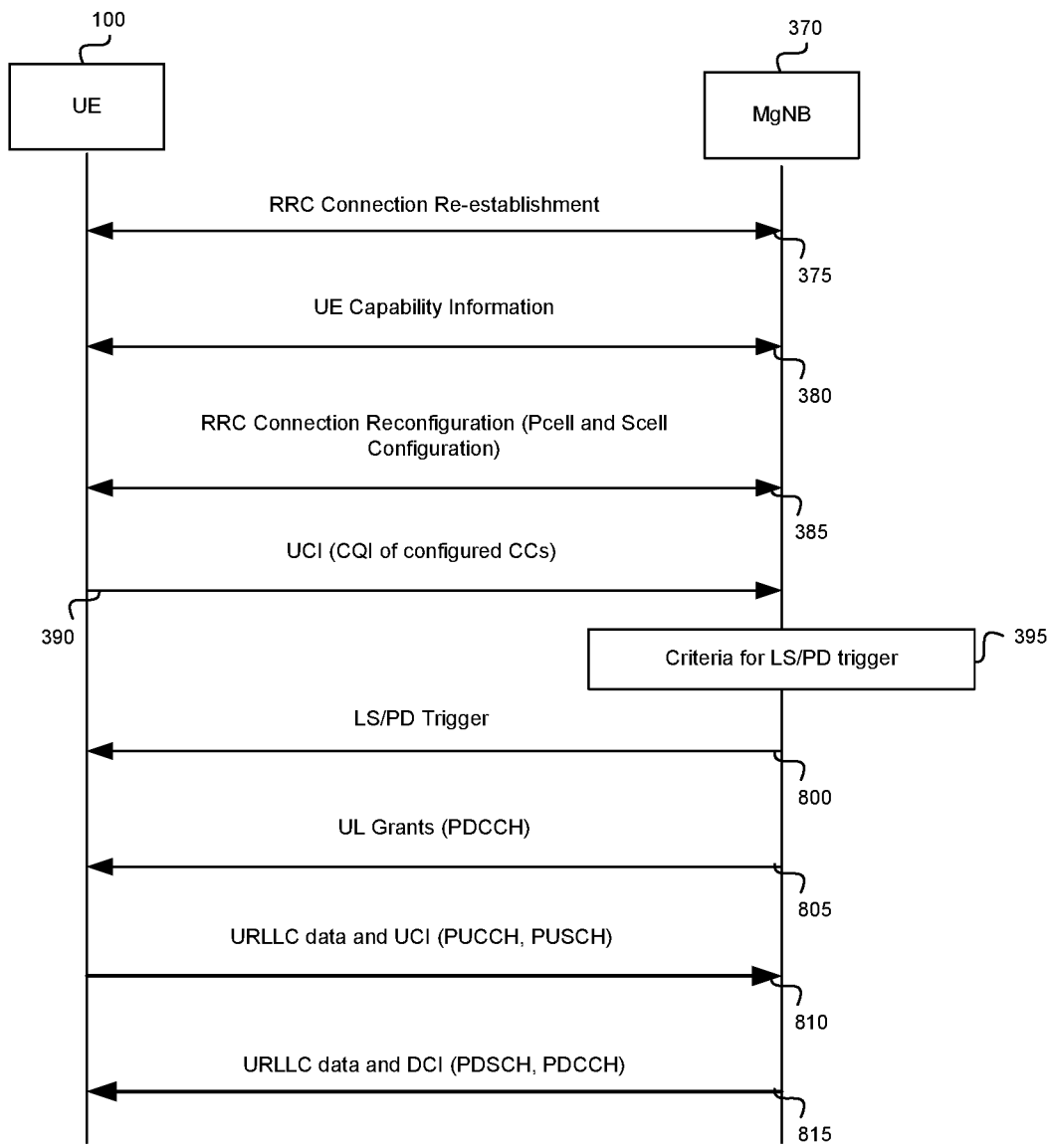
FIG. 12 illustrates example message flows for a Network triggered LS/PD activation procedure, according to an embodiment.

First, a network triggered approach will be discussed according to embodiments. An example network triggered LS/PD activation procedure is illustrated in FIG. 12, according to an embodiment. In the network triggered approach, the MgNB 370 initially activates the PCell and deactivates the SCells among the set of links/CCs configured by the RRC. The activation/deactivation status of the links/CCs can be conveyed to the UE 100 via the MAC control elements (MAC CEs). Note that in the case of MC/DC, the set of links utilized for PD may include those from both the MGC (MgNB) and SGC (SgNB).

The MgNB 370 may also request the channel quality information (CQI) reports from UE 100 on all activated links/CCs via a DL control information (DCI) signal. The UE 100 transmits the CQI reports via the UCI. If PDCP/RLC data buffer is non-empty, the UE 100 may also transmit the Scheduling Request (SR) on the UCI.

Based on the channel measurements and the overall load information, the MgNB 370 may use a triggering criterion to determine the best transmission mode for the UE 100. That is, the selection of LS or PD is performed by selecting the best k CCs (or links) out of the n available CCs, where when k=1 LS is selected and when k>1 PD is selected. As an example, the steps involved in the triggering criteria can be listed as follows:

i) If the CQI and the resources available on the best link is sufficient to meet the reliability requirement, the MgNB 370 selects the LS mode ii) If the CQI and the resources available on the best link are not sufficient to meet the reliability requirement then the MgNB 370 considers the second best link for selecting the PD mode. The second best link should satisfy the following criteria: i) the CQI of the second best link is above a CQI_threshold, ii) the delta_CQI of the best link and the second best link is below a delta_threshold and iii) the resources available on the second best link is above a resource_threshold.

iii) If the two best links are not sufficient to meet the reliability requirement then the MgNB 370 also considers the third best link. The third best link should also satisfy the above requirements for CQI_threshold, delta_threshold and resource threshold.

iv) This procedure is repeated until the reliability requirement is satisfied or there are no more links (cells/carriers).

In the case when LS is selected, the MgNB 370 selects one activated link/CC and sends a DCI, to assign DL resources or to grant UL resources for a single transmission.

If PD is selected, the MgNB 370 selects multiple activated links/CCs and sends a DCI for each of the selected link/CC. A new DCI format may be used to indicate that the UL grant is used for PD. The new packet duplication field may be a single bit to identify which grants are used for PD.

Alternatively, the packet duplication field may be a sequence number, which identifies the grants that are used for specific PD transmissions.

In another embodiment, a single UL grant can be sent to the UE, which indicates the cells/carriers to use for PD.

Based on the selected mode the MgNB allocates resources on the activated link(s)/CC(s) and indicates the resource configuration (e.g. PRBs, MCS, antenna ports) to the UE in the DCI. The MgNB may also provide UL grants and activates the semi-persistent scheduling (SPS) configuration via the DCI.

In the UL, the UE transmits the data on Physical UL shared channel (PUSCH) while continuing to report the CQI on all activated CCs (on Physical UL control channel (PUCCH)). Subsequent transmissions may include the Buffer Status report (BSR) on the MAC CE.

In the DL, the data is transmitted on the scheduled links(s)/CC(s) on Physical DL shared channel (PDSCH).

The MgNB may update the configured link/CC set which can be indicated to the UE via the RRC Connection Reconfiguration procedure As an example, during the process, UE 100 and MgNB 370 exchange "RRC Connection Re-establishment" information via signal 375, "UE Capability Information" via signal 380, and "RRC Connection Reconfiguration (Pcell and Scell Configuration)" via signal 385.

The triggering criteria may be exemplified by "Criteria for LS/PD trigger" process 395. During this process UE 100 and MgNB 370 exchange "LS/PD Trigger (MAC CE)" information via signal 800, "UL Grants (PDCCH)" via signal 805, and "URLLC data and UCI (PUCCH, PUSCH)" via signal 810.

According to an example, reports of the process may be communicated on the Physical UL control channel (PUCCH) via the "UCI (CQI of configured CCs)" signal 390.

According to a further example, the DCI may be sent via "URRLC data and DCI (PDSCH, PDCCH)" signal 815.

Figure 13:
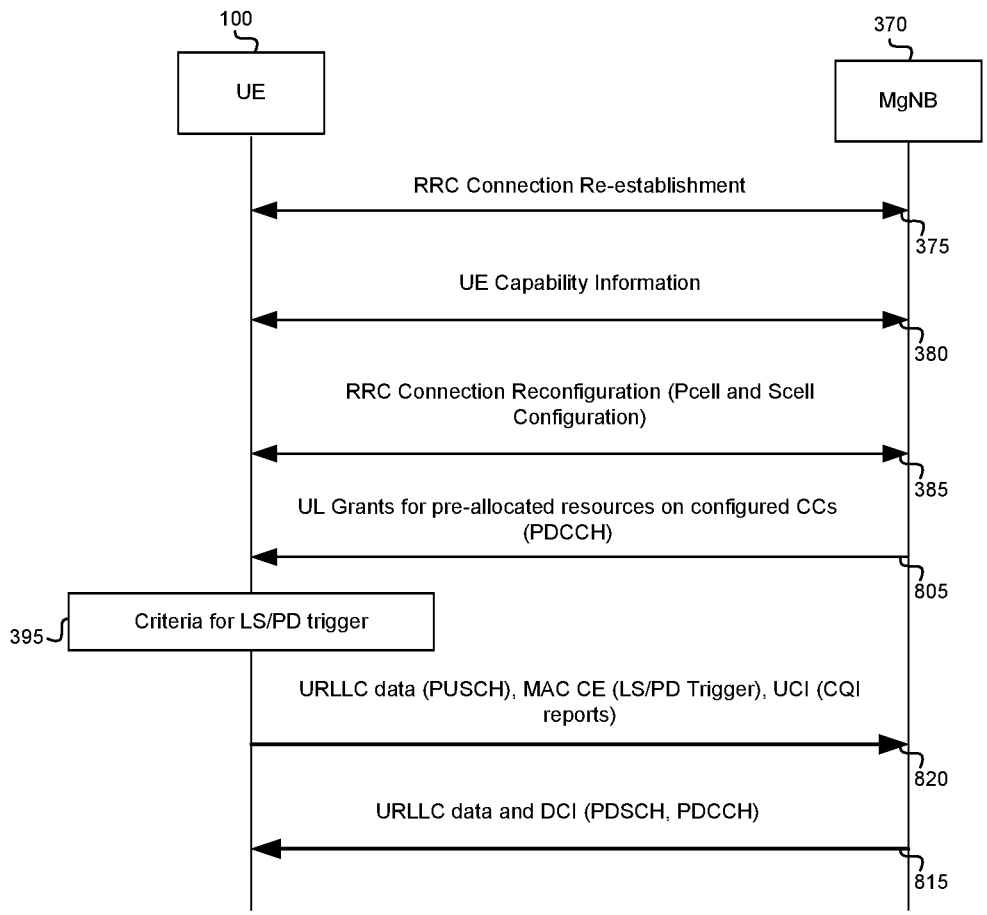
FIG. 13 illustrates example message flows for a UE triggered LS/PD activation procedure, according to an embodiment.

A UE triggered approach will now be discussed according to embodiments. An example UE triggered LS/PD activation procedure is illustrated in FIG. 13, according to an embodiment. Similar to the network triggered case, in the UE 100 triggered case the MgNB 370 activates a set of links/CCs for the UE 100 to perform channel measurements. All links/CCs, except for PCell, are initially set to be in the default deactivated state.

However, in contrast to the network triggered case, the MgNB may pre-allocate certain resources on the configured links while still retaining the links in deactivated state. The MgNB may also provide resource configuration (e.g. PRBs, range of potential MCS along with the UL grants via the DCI. In addition, the UL grant for each link may contain a validity timer, indicating the duration in which the resources in the corresponding links are valid and reserved for the UE Based on availability of data in the PDCP/RLC buffer and the measured channel conditions, UE may apply a criterion to determine the trigger for selecting the PD mode. As an example, the steps involved in the triggering criteria for LS/PD are listed as follows:

i) If the CQI of the best link is sufficient to meet the reliability requirement, the UE selects the LS mode ii) If the CQI of the best link is not sufficient to meet the reliability requirement then the UE considers the second best link for selecting the PD mode. The second best link should satisfy the following criteria: i) the CQI of the second best link is above a CQI_threshold, ii) the delta_CQI of the best link and the second best link is below a delta_threshold.

iii) If the two best links are not sufficient to meet the reliability requirement then the UE also considers the third best link. The third best link should also satisfy the above requirements for CQI_threshold and delta_threshold.

iv) This procedure is repeated until the reliability requirement is satisfied or there are no more links (cells/carriers).

In the UL, the UE 100 transmits data on the PUSCH. In the DL, the data is transmitted on the scheduled links (cells/CCs) on PDSCH.

Additionally, it should be possible for the MgNB to overrule the UE-triggered selection capability dynamically by sending an indicator in the PDCCH to limit the use of the grant free resources to the primary cell/carrier. This indicator can be a single bit to indicate whether or not the UE uses PD on the grant free resources on the different cells/carriers. The PD indicator can be signaled either dynamically or semi-statically.

Alternatively, there can be a PD indicator for the grant free resources on each cell/carrier. The UE can only use the grant free resources on the cells/carriers where the PD indicator is set.

In another embodiment, RRC signaling can be used to configure PD on the grant free resources on multiple cells/carriers.

Signalling for Packet Duplication will now be discussed, according to embodiments. The criteria for activating and deactivating packet duplication depend on the DL and UL channel conditions as well as on the loading in the different cells/carriers. In both DC/MC and CA architectures, the MgNB (PCell) makes the decision on whether or not to activate packet duplication for the UE.

Once packet duplication is activated, the MgNB can dynamically decide how many links (cells) are used for both DL and UL transmission to satisfy the required reliability. The UE may receive one or more DL assignments or UL grants for the transmission of a packet.

The number of links that are used for UL and DL may be different. This is because the loading in the UL can DL can be significantly different.

The network may also provide the UE with criteria to determine when to use packet duplication, while the UE is configured for packet duplication. This allows the UE to decide when to use packet duplication.

Pre-allocation described above conforms with the grant-free technique where resources are pre-allocated for the UEs without going through the dynamic scheduling procedure involving scheduling request (SR) sent by the UE and subsequent resource allocation. By way of example, MgNB 370 informs UE 100 of the UL grant via the "UL Grants for pre-allocated resources on configured CCs (PDCCH)" signal 805. During this process, MgNB 370 and UE 100 also exchange "RRC Connection Re-establishment" information via signal 375, "UE Capability Information" via signal 380, and "RRC Connection Reconfiguration (Pcell and Scell Configuration)" via signal 385.

According to example implementations, the trigger criterion may be satisfied by the "Criteria for LS/PD trigger" process 395). Further, the data may be transmitted in UL by via "URLLC data (PUSCH), MAC CE (PS/PD Trigger), UCI (CQI reports)" signal 820 and by "URLLC data and DCI (PDSCH, PDCCH)" signal 815 in DL.

Figure 14:
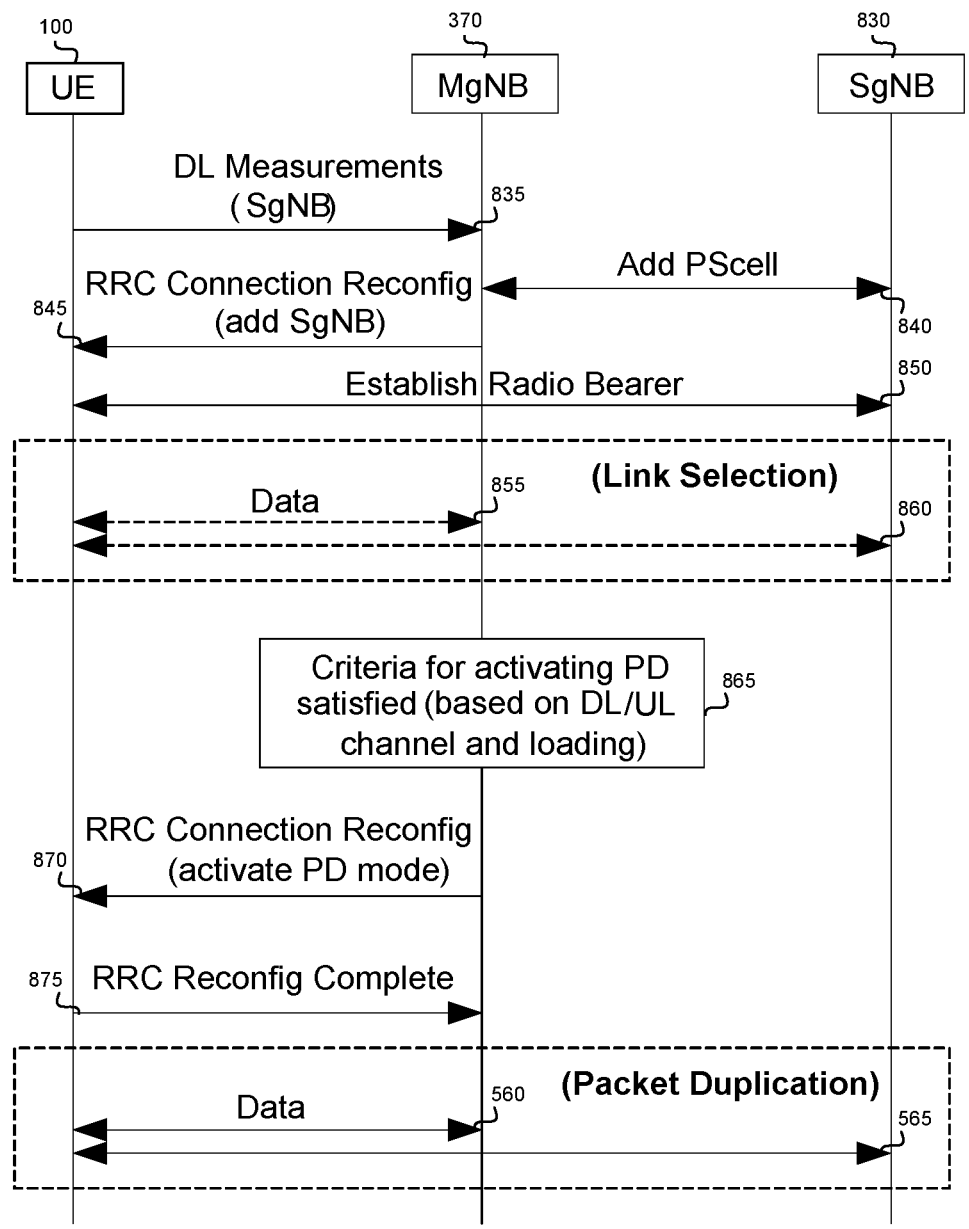
FIG. 14 illustrates example Signalling flow for activating packet duplication, according to an embodiment.

FIG. 14 illustrates an example Signalling flow for activating packet duplication, according to embodiments. In this procedure, new cells/carriers can be added for the UE 100 based on the UE's measurement reports. The serving MgNB can use link selection to determine the best cell/carrier to send the packets. If the criteria for activating packet duplication (PD) 865 are satisfied then the serving MgNB 370 sends an RRC connection Reconfiguration message 870 to active the PD mode. Once the UE 100 sends the RRC Reconfiguration Complete message 875, the packet duplication mode can be activated. This means the UE can receive multiple DL assignment messages and multiple UL grants for the same URLLC packet. Use of the link selection may be via Data 855 passed between UE 100 and MgNB 370 and Data 860 passed between UE 100 and SgNB 830.

UE 100 signals MgNB 370 of the DL Measurements (SgNB) 835, MgNB 370 and SgNB 830 exchange "Add PScell" information 840, and MgNB 370 transmits RRC Connection Reconfig (add SgNB) message 845. A radio bearer 850 is also established between UE 100 and SgNB 830. Once PD has been configured for a Data Radio Bearer (DRB), MAC 100 control elements to activate or deactivate PD. Duplicated packets are sent between UE 100 and MgNB 370 via Data 560 and between UE 100 and SgNB 830 via Data 565.

Figure 15:
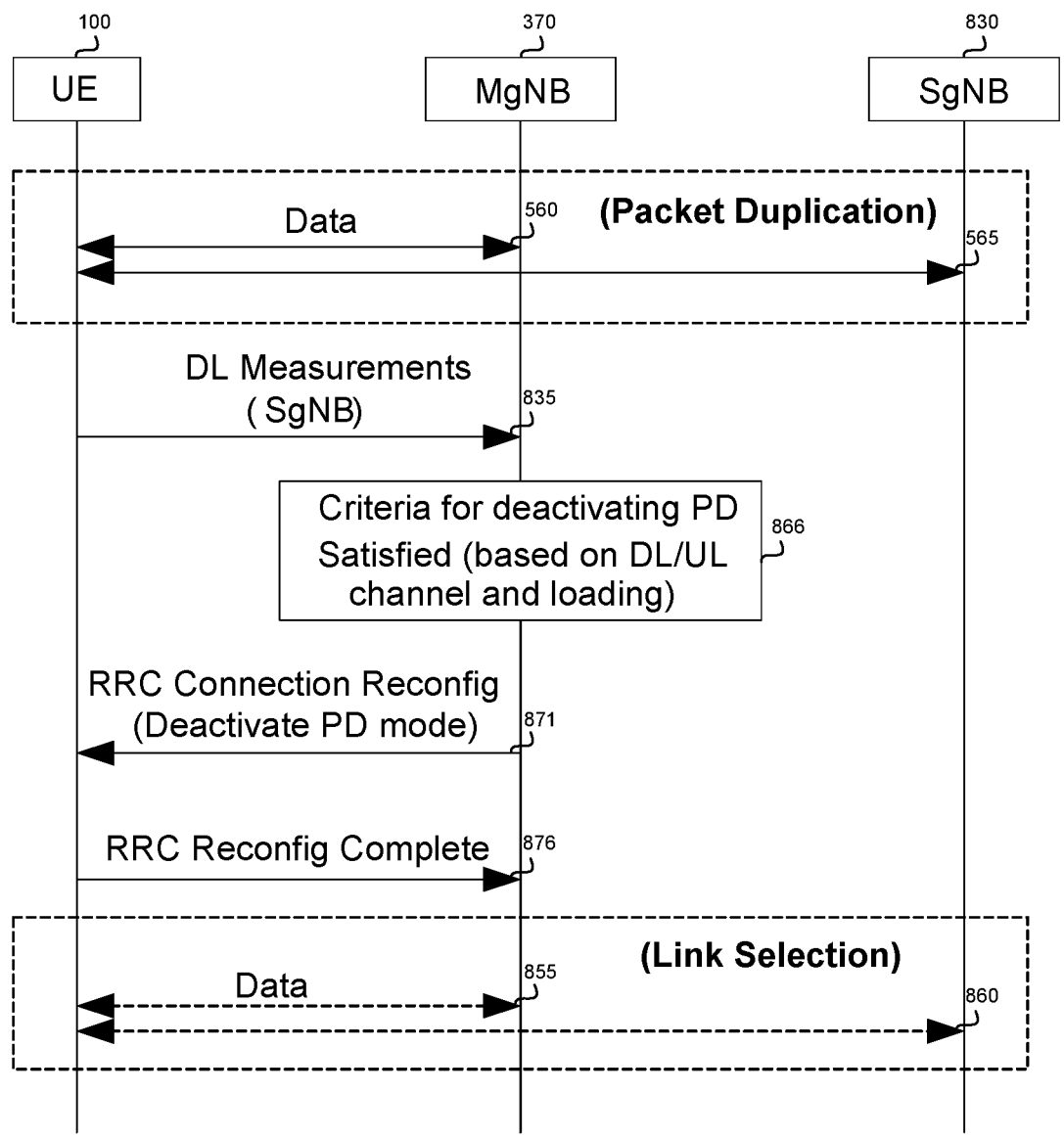
FIG. 15 illustrates example Signalling flow for deactivating packet duplication, according to an embodiment.

FIG. 15 illustrates example Signalling flow for deactivating packet duplication, according to embodiments. In this procedure, if the UE 100 is in PD mode, the serving MgNB 370 evaluates the criteria for deactivating PD based on the UE's channel measurements and on the loading in the cells/carriers. If the PD criteria are satisfied, the MgNB 370 sends an RRC Connection Reconfiguration message 871 to deactivate the PD mode. Once the UE 100 sends the RRC Reconfiguration Complete message 876, the PD mode can be disabled and the serving MgNB can use link selection to transmit the packets.

The link selection process involves sharing Data 855 between UE 100 and MgNB 370 and Data 860 between UE 100 and SgNB 830. According to an example, duplicated packets flow between UE 100 and MgNB 370 via signal 560 and between UE 100 and SgNB 830 via signal 565. Evaluation of the criteria for deactivating PD may be via process 866. Channel measurements may be received from UE 100 by MgNB 370 via "DL Measurements (SgNB)" signal 835).

Figure 16:
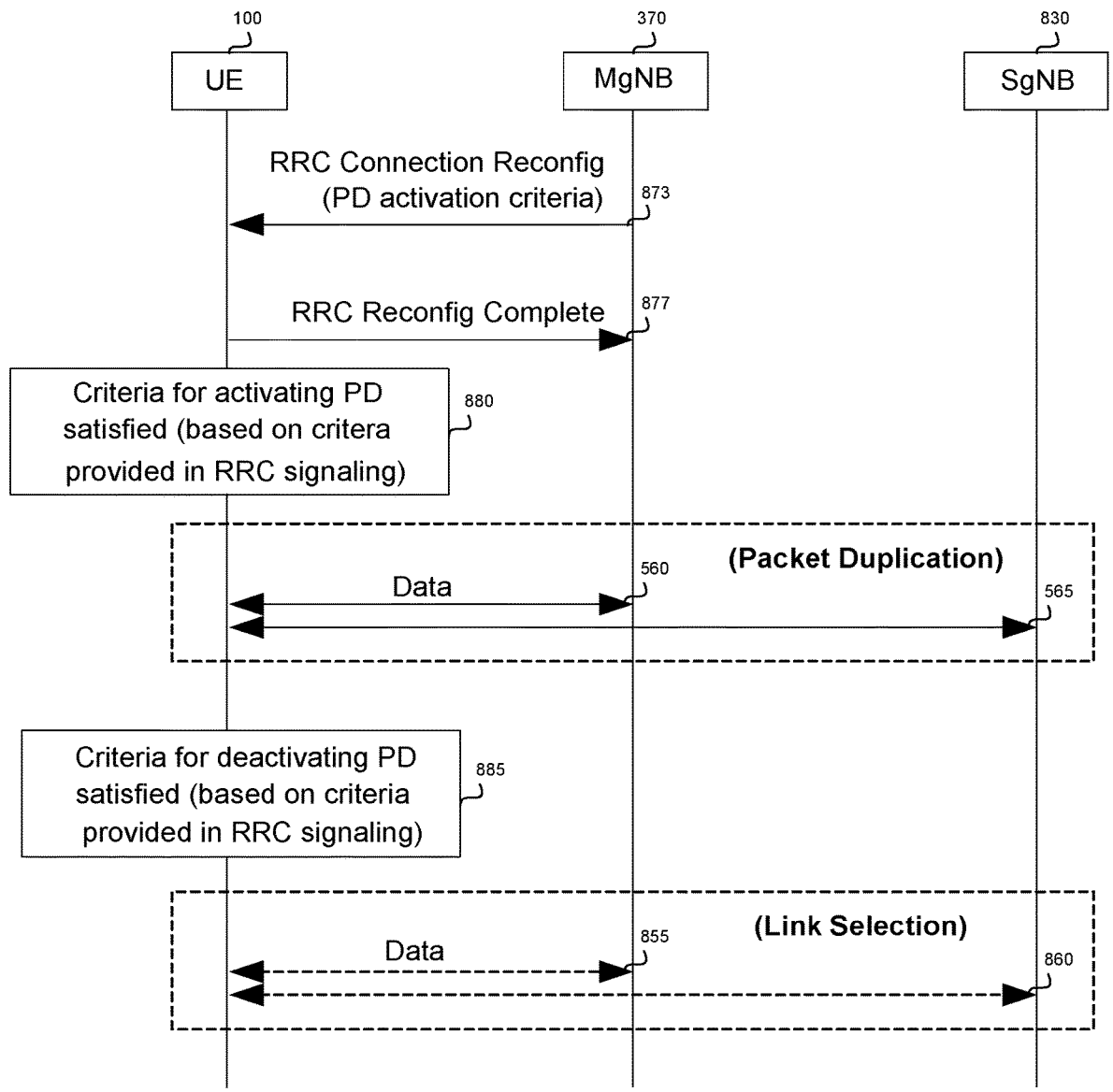
FIG. 16 illustrates example Signalling flow for activating and deactivating packet duplication based on criteria sent to the UE through RRC signalling, according to an embodiment.

In some scenarios, the MgNB can provide the UE with criteria to activate/deactivate packet duplication. The UE evaluates the criteria to determine when to use packet duplication. FIG. 16 illustrates example Signalling flow for activating and deactivating packet duplication based on criteria sent to the UE 100 through RRC signalling, according to embodiments. In this procedure, the MgNB 370 sends an RRC Connection Reconfiguration message 873 to configure the UE 100 with the PD activation criteria. In this case, the UE 100 is also configured with resources that can be used for packet duplication (e.g. grant free resources on multiple cells/carriers).

In some embodiments, the same signalling for activating/deactivating packet duplication can be applied in both DC/MC and CA architectures.

In some embodiments, RRC signalling can be used to configure the packet duplication mode for the UE.

In some embodiments, the criteria for activating and deactivating packet duplication can depend on the DL and UL channel conditions as well as loading in the cell.

In some embodiments, the decision to use packet duplication for UL and DL can be determined independently.

In some embodiments, the decision to use packet duplication, while the UE is in packet duplication mode, can be made by the network. In other words, even if the UE is in packet duplication mode, the network can override the decision.

In some embodiments, the network may provide the UE with criteria to determine when to activate/deactivate packet duplication. The UE uses the criteria to make the decision on when to use packet duplication.

It should be appreciated that the methods described above can be implemented by controllers in the various devices (e.g., UE 100, MgNB 370, SgNB 830, etc.). Accordingly, various embodiments include a controller including a processor and machine readable instructions which when executed by the processor cause the device to implement the above described methods and signaling.

Some of the Embodiments listed may be considered examples of the criteria for activating PD 880 and the criteria for deactivating PD 885.

According to an example, UE 100 informs MgNB 370 that it has completed this configuration via the RRC Reconfig Complete message 875. Once the UE determines the criteria for activating PD (based on criteria provided in the RRC signaling) is satisfied 880, the UE switches into PD mode. At which point, duplicated packets flow between UE 100 and MgNB 370 via Data 560 and between UE 100 and SgNB 830 via Data 565. Once the UE determines the criteria for deactivating PD (based on criteria provided in RRC signalling) is satisfied 885, the UE deactivates PD mode. At which point link selection "Data" is passed between UE 100 and MgNB 370 via signal 855 and UE 100 and SgNB 830 via signal 860.

Figure 17:
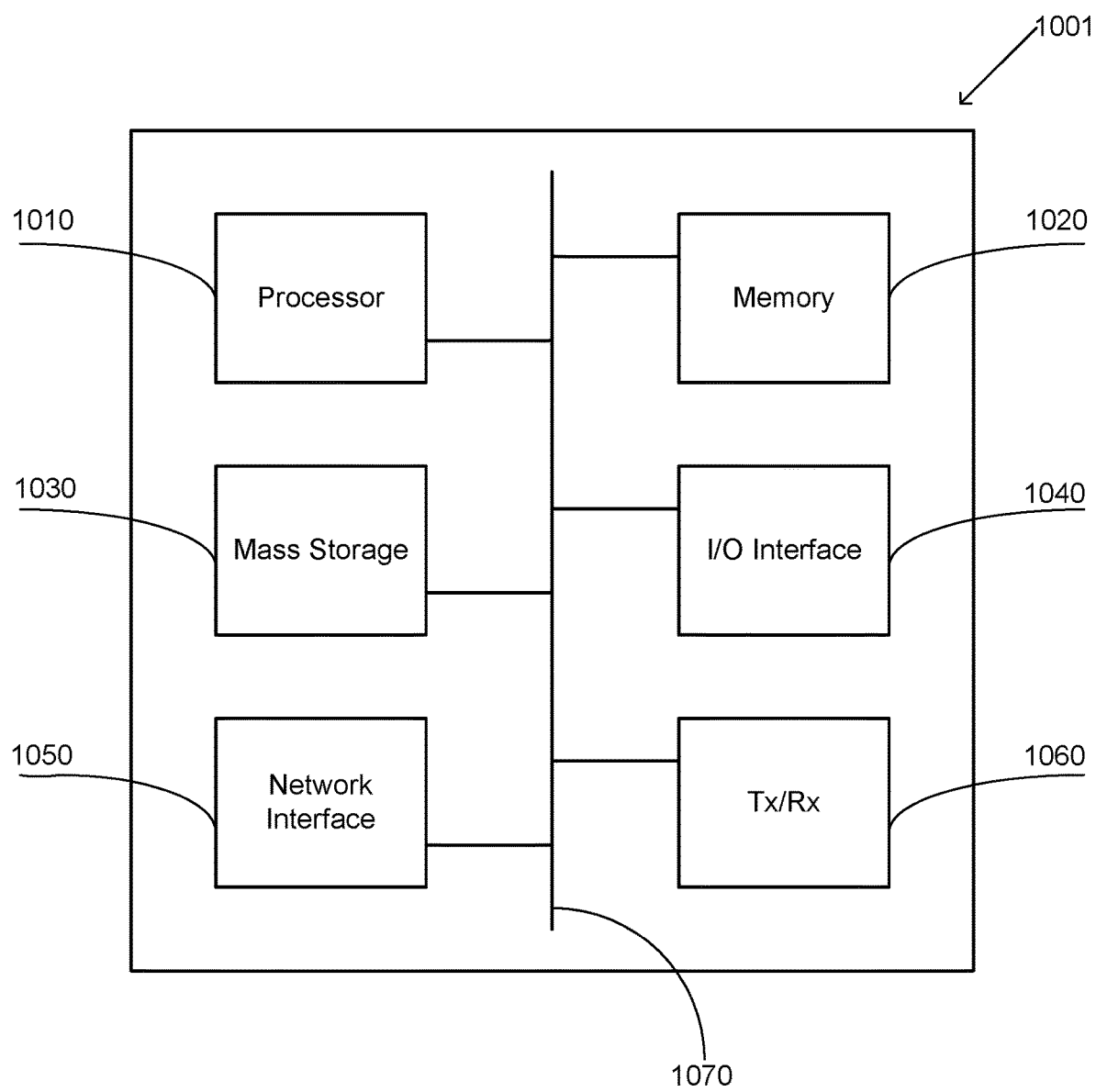
FIG. 17 is a block diagram of a processing system that may be used for implementing the various network functions and the methods and signaling as described herein.

FIG. 17 is a block diagram of a processing system 1001 that may be used for implementing the various network functions and the methods and signaling as described above, according to embodiments. As shown in FIG. 17, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1001 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps. The processing system 1001 can be used to implement a UE or host which executes the various network and UE functions described herein. In an example, the host herein may be a RAN node.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Further embodiments of the present invention are provided in the following. It should be noted that the numbering used in the following section does not necessarily need to comply with the numbering used in the previous sections.

Embodiment 1

A method of handover of a User Equipment (UE) in a radio access network, for execution by a source radio access node having a first Radio Resource Control (RRC) connection to the UE, the method comprising:
determining that criteria for a seamless handover of the UE to a target radio access node have been satisfied;
transmitting to the UE an instruction to establish a second radio connection between the UE and the target radio access node while maintaining the radio and RRC connection with the source radio access node;
receiving, in response to the instruction to the UE to establish a radio connection, an indication that the second radio connection to the target radio access node has been established; and
transmitting to the UE an RRC connection reconfiguration command to move the RRC connection from the source RAN node to the target RAN node.

Embodiment 2

The method of embodiment 1 wherein the step of determining that criteria for a seamless handover have been satisfied includes receiving measurement reports from the UE.

Embodiment 3

The method of any preceding embodiment wherein the step of transmitting to the UE an instruction to establish a second radio connection includes transmitting an instruction to establish a second radio connection in parallel to the first radio connection that support the RRC connection.

Embodiment 4

The method of any preceding embodiment further including the step of transmitting data to the UE after transmitting to the UE the instruction to establish as second radio connection.

Embodiment 5

The method of any of embodiments 1 to 3 further including the step of transmitting data to the UE after receiving an indication that the second radio connection has been established.

Embodiment 6

A method of handover of a User Equipment from a first radio access node, with which a first Radio Resource Control (RRC) connection has been established, to a second radio access node in a radio access network, the method comprising:
transmitting to the first radio access node a signal measurement report indicative of the ability to connect to the second radio access node;
in response to receipt of an instruction from the first radio access node, establishing a second radio connection with the second radio access node;
transmitting data to, or receiving data from, the first and second radio access nodes;
and releasing the first RRC connection.

Embodiment 7

The method of embodiment 6 wherein the data transmitted to or received from the first and second radio access nodes is the same.

Embodiment 8

The method of any of embodiments 1 to 5 further comprising transmitting to the UE a detach command instructing the UE to release the first RRC connection.

Embodiment 9

The method of embodiment 8 wherein transmitting to the UE a detach command is subsequent to transmitting to the UE an RRC connection reconfiguration command.

Embodiment 10

Architectures as described.

Embodiment 11

A method of applying the same signalling for activating/deactivating packet duplication in both DC/MC and CA architectures.

Embodiment 12

A method of RRC signalling used to configure the packet duplication mode for the UE.

Embodiment 13

A method for activating and deactivating packet duplication utilizing criteria dependent on the DL and UL channel conditions as well as loading in the cell.

Embodiment 14

The method of embodiment 13 wherein the decision to use packet duplication for UL and DL can be determined independently.

Embodiment 15

A method of deciding to implement packet duplication determined by a UE.

Embodiment 16

The method of embodiment 15 wherein the UE receives criteria to determine when to activate/deactivate packet duplication from a network node.

Embodiment 17

A method of deciding to implement packet duplication determined by a network node.

Embodiment 18

The method of embodiment 17 wherein the network node can instruct a UE in packet duplication mode to change modes.

Embodiment 19

A method of handover of a User Equipment (UE) in a radio access network, for execution by a source radio access node having a first Radio Resource Control (RRC) connection to the UE, the method comprising:
receiving measurement reports from the UE;
transmitting to the UE an instruction to establish a second radio connection between the UE and a target radio access node while maintaining the radio and RRC connection with the source radio access node;
receiving, in response to the instruction to the UE to establish a radio connection, an indication that the second radio connection to the target radio access node has been established; and
transmitting to the UE an RRC connection reconfiguration command to move the RRC connection from the source RAN node to the target RAN node.

Embodiment 20

A method of a receiver, comprising:
activating the PD at a PDCP layer of the receiver; and
removing duplicate PDCP PDUs at the PDCP layer, wherein the duplicate PDCP PDUs are received from two RLC entities.

Embodiment 21

The method of claim 1, the activation of PD is applied in a dual-connectivity (DC)/multi-connectivity (MC) architecture or a CA architecture.

Embodiment 22

The method of claim 20 or 21, further comprising: deactivating the PD at the PDCP layer.

Embodiment 23

The method of any of claims 20-22, MAC control elements (MAC CEs) may be conveyed between the receiver and a transmitter to trigger an activation or a deactivation of the PD.

Embodiment 24

The method of any of claims 20-23, further comprising: transmitting RRC signalling for configuring the PD at a transmitter of the PDCP PDUs.

Embodiment 25

The method of any of claims 20-24, further comprising: transmitting RRC signalling for activating or deactivating the PD at a transmitter of the PDCP PDUs.

Embodiment 26

The method of any of claims 20-25, wherein a PD removal function at the PDCP layer performs combining of the received PDCP PDUs.

Although the present disclosure has been described with reference to specific features and embodiments thereof, it is evident that various modifications and combinations can be made thereto without departing from the disclosure. The specification and drawings are, accordingly, to be regarded simply as an illustration of examples of an invention defined by the appended claims, and are contemplated to cover any and all modifications, variations, combinations or equivalents that fall within the scope of the present disclosure.

That which is claimed is:
1. A method comprising:
receiving, by a user equipment (UE), radio resource control (RRC) signaling from a radio access network (RAN) node, wherein the information RRC signaling is for configuring a packet duplication (PD) mode for a radio bearer;
receiving, by the UE, a medium access control (MAC) control element (CE) to perform one of activating and deactivating the PD mode for the radio bearer;
performing one of activating and deactivating the PD mode for the radio bearer based on the received MAC CE:
after activating the PD mode, duplicating a packet data convergence protocol (PDCP) PDU at the PDCP layer of the UE, and transmitting the PDCP PDU and its duplicate to different radio link control (RLC) entities; and
after deactivating the PD mode, transmitting the PDCP PDU to one RLC entity without duplicating it.
2. The method of claim 1, wherein the UE supports a carrier agggregation (CA) architecture.
3. The method of claim 2, wherein the PDCP PDU and its duplicate are transmitted on different carriers.
4. The method of claim 1, wherein a PD function at the PDCP layer is responsible for the duplicating.
5. The method of claim 1, wherein the PDCP PDU is an uplink (UL) PDCP PDU.
6. The method of claim 1, wherein the RRC signaling for configuring a packet duplication (PD) mode for a radio bearer includes information for configuring the radio bearer for the PD.

7. The method of claim 1, wherein the RRC signaling for configuring a packet duplication (PD) mode for a radio bearer includes information for setting the PD mode as one of activated and deactivated.

8. The method of claim 1, wherein the UE supports a dual-connectivity (DC)/multi-connectivity (MC) architecture.

9. The method of claim 1, wherein the MAC CE to perform one of activating and deactivating the radio bearer includes information to configure the radio bearer for the PD.

10. The method of claim 1, wherein the MAC CE to perform one of activating and deactivating the radio bearer includes information to set the PD mode as activated or deactivated 11. An apparatus comprising:
a processor coupled with a memory, and a transceiver;
wherein the transceiver is configured to:
receiving, radio resource control (RRC) signaling from a radio access network (RAN) node, wherein the RRC signaling is for configuring a packet duplication (PD) mode for a radio bearer;
receiving a medium access control (MAC) control element (CE) to perform to be one of activating and deactivating the PD mode for the radio bearer; and
the processor is configured for:
performing one of activating and deactivating the PD mode for the radio bearer based on the received MAC CE;
after activating the PD mode, duplicating a packet data convergence protocol (PDCP) PDU at the PDCP layer of the UE, and transmitting the PDCP PDU and its duplicate to different radio link control (RLC) entities; and
after deactivating the PD mode, transmitting the PDCP PDU to one RLC entity without duplicating it.

12. The apparatus of claim 11, wherein the apparatus supports a carrier aggregation (CA) architecture.

13. The apparatus of claim 12, wherein the PDCP PDU and its duplicate are transmitted on different carriers.

14. The apparatus of claim 11, wherein a PD function at the PDCP layer of the apparatus is responsible for the duplicating.

15. The apparatus of claim 11, wherein the transceiver is configured to receive RRC signalling for configuring the PD, including the MAC CE.

16. The apparatus of claim 11, wherein the apparatus supports a dual-connectivity (DC)/multi-connectivity (MC) architecture.

17. The apparatus of claim 12, wherein the MAC CE to perform one of activating and deactivating the radio bearer includes information to configure the radio bearer for the PD.

18. The apparatus of claim 12, wherein the MAC CE to perform one of activating and deactivating the radio bearer includes information to set the PD mode as activated or deactivated.

19. The apparatus of claim 12, wherein the RRC signaling for configuring a packet duplication (PD) mode for a radio bearer includes information for configuring the radio bearer for the PD.

20. The apparatus of claim 11, wherein the RRC signaling for configuring a packet duplication (PD) mode for a radio bearer includes information for setting the PD mode as one of activated and deactivated.

21. A communication system comprising a user equipment (UE) and a radio access network (RAN) node, wherein the RAN node is configured to:
transmit radio resource control (RRC) signaling, wherein the RRC signaling is for configuring a packet duplication (PD) mode for a radio bearer;
transmit a medium access control (MAC) control element (CE) to perform one of activating and deactivating the PD mode for the radio bearer; and
the UE is configured to:
receive the MAC CE and perform one of activating and deactivating the PD mode for the radio bearer based on the received MAC CE;
after activating the PD mode, duplicate a packet data convergence protocol (PDCP) PDU at the PDCP layer of the UE, and transmitting the PDCP PDU and its duplicate to different radio link control (RLC) entities; and
after deactivating the PD mode, transmit the PDCP PDU to one RLC entity without duplicating it.

22. The communication system of claim 21, wherein the UE is configured to support a carrier aggregation (CA) architecture.

23. The communication system of claim 22, wherein the PDCP PDU and its duplicate are transmitted on different carriers.

24. The communication system of claim 21, wherein a PD function at the PDCP layer of the UE is responsible for the duplicating.

* * * * *